(12) United States Patent
Roberts et al.

(10) Patent No.: US 11,330,215 B2
(45) Date of Patent: May 10, 2022

(54) HIGH DENSITY PARALLEL PROXIMAL IMAGE PROCESSING

(71) Applicant: IDEAL Industries Lighting LLC, Durham, NC (US)

(72) Inventors: John Roberts, Durham, NC (US); Robert Bowser, Cary, NC (US)

(73) Assignee: IDEAL INDUSTRIES LIGHTING LLC, Sycamore, IL (US)

( * ) Notice: Subject to any disclaimer, the term of this patent is extended or adjusted under 35 U.S.C. 154(b) by 0 days.

(21) Appl. No.: 16/953,554

(22) Filed: Nov. 20, 2020

(65) Prior Publication Data

US 2021/0092318 A1 Mar. 25, 2021

Related U.S. Application Data

(63) Continuation of application No. 15/935,043, filed on Mar. 25, 2018, now Pat. No. 10,868,991.

(51) Int. Cl.

| | |
|---|---|
| *H04N 5/374* | (2011.01) |
| *H04N 5/369* | (2011.01) |
| *H04N 5/372* | (2011.01) |
| *H04N 5/3745* | (2011.01) |
| *G05B 15/02* | (2006.01) |
| *H04N 5/378* | (2011.01) |
| *G01J 1/44* | (2006.01) |

(52) U.S. Cl.
CPC .......... *H04N 5/37455* (2013.01); *G01J 1/44* (2013.01); *G05B 15/02* (2013.01); *H04N 5/378* (2013.01); *H04N 5/3742* (2013.01); *H04N 5/37213* (2013.01)

(58) Field of Classification Search
None
See application file for complete search history.

(56) References Cited

U.S. PATENT DOCUMENTS

| | | |
|---|---|---|
| 9,769,900 B2 | 9/2017 | Underwood et al. |
| 10,868,991 B2 | 12/2020 | Roberts et al. |
| | (Continued) | |

OTHER PUBLICATIONS

Non-Final Office Action for U.S. Appl. No. 15/935,043, dated Jul. 23, 2019, 30 pages.

(Continued)

*Primary Examiner* — Mark T Monk
(74) *Attorney, Agent, or Firm* — Withrow & Terranova, P.L.L.C.

(57) ABSTRACT

A distributed, parallel, image capture and processing architecture provides significant advantages over prior art systems. A very large array of computational circuits—in some embodiments, matching the size of the pixel array—is distributed around, within, or beneath the pixel array of an image sensor. Each computational circuit is dedicated to, and in some embodiments is physically proximal to, one, two, or more associated pixels. Each computational circuit is operative to perform computations on one, two, or more pixel values generated by its associated pixels. The computational circuits all perform the same operation(s), in parallel. In this manner, a very large number of pixel-level operations are performed in parallel, physically and electrically near the pixels. This obviates the need to transfer very large amounts of pixel data from a pixel array to a CPU/memory, thus alleviating the significant high-speed performance constraints placed on modern image sensors.

23 Claims, 17 Drawing Sheets

(56) References Cited

U.S. PATENT DOCUMENTS

| | | | |
|---|---|---|---|
| 2001/0041012 | A1 | 11/2001 | Hsieh et al. |
| 2015/0029373 | A1 | 1/2015 | Yamaguchi et al. |
| 2015/0049232 | A1 | 2/2015 | Kim et al. |
| 2015/0130977 | A1 | 5/2015 | Ladd |
| 2015/0223309 | A1 | 8/2015 | Mohan et al. |
| 2015/0355613 | A1 | 12/2015 | Palmer |
| 2015/0365618 | A1 | 12/2015 | Okura et al. |
| 2015/0381917 | A1 | 12/2015 | Mabuchi |
| 2016/0142758 | A1 | 5/2016 | Karp et al. |
| 2016/0221762 | A1 | 8/2016 | Schroader |
| 2016/0366347 | A1 | 12/2016 | Shin et al. |
| 2017/0016771 | A1 | 1/2017 | Koresko |
| 2017/0033944 | A1 | 2/2017 | Nadathur et al. |
| 2017/0054922 | A1 | 2/2017 | Novotny et al. |
| 2017/0078400 | A1 | 3/2017 | Binder et al. |

OTHER PUBLICATIONS

Final Office Action for U.S. Appl. No. 15/935,043, dated Dec. 20, 2019, 48 pages.
Non-Final Office Action for U.S. Appl. No. 15/935,043, dated Apr. 7, 2020, 38 pages.
Notice of Allowance for U.S. Appl. No. 15/935,043, dated Aug. 10, 2020, 12 pages.
Coi et al. CMOS Sensors: CMOS and CCD combine in NIR time-of-flight on-chip imager. Downloaded from: https://www.laserfocusworld.com/articles/print/volume-51/issue-08/features/cmos-sensors-cmos-and-ccd-combine-in-nir-time-of-flight-on-chip-imager.html on Mar. 14, 2018.
Teledyne Anafocus. CMOS Vision Systems on Chip (VSoC). Downloaded from: https://teledyne-anafocus.com/technology/cmos-vision-systems-on-chip-vsoc/ on Mar. 14, 2018.
FONTAINE. The State-of-the-Art of Mainstream CMOS Image Sensors. Downloaded from: http://www.chipworks.com/sites/default/files/Fontaine_0.1_The%20State-of-the-Art%20of%20Mainstream%20CMOS%20Image%20Sensors.pdf on Mar. 14, 2018.
Analog Devices, Inc. Real-Time Analog Computational Unit (ACU)—AD538. Downloaded from: http://www.analog.com/media/en/technical-documentation/data-sheets/AD538.pdf on Mar. 14, 2018.
Computational Circuits—Chapter 9—Practical Analog Semiconductor Circuits. Downloaded from: https://www.allaboutcircuits.com/textbook/semiconductors/chpt-9/computational-circuits/on Mar. 14, 2018.
Woo et al. A Spiking-Neuron Collective Analog Adder with Scalable Precision Downloaded from: http://www.rle.mit.edu/acbs/wp-content/uploads/2013/09/woo_2013_iscas_collective_analog_adder.pdf on Mar. 14, 2018.
Wikipedia. Analog computer. Downloaded from: https://en.wikipedia.org/wiki/Analog_computer on Mar. 14, 2018.
Xue. Recent Development in Analog Computation—A Brief Overview. Downloaded from: https://arxiv.org/ftp/arxiv/papers/1504/1504.00450 pdf on Mar. 14, 2018.
N. Guo et al., "Energy-Efficient Hybrid Analog/Digital Approximate Computation in Continuous Time," IEEE Journal of Solid-State Circuits, vol. 51, No. 7, pp. 1514-1524, Jul. 2016.

HIGH DENSITY PARALLEL PROXIMAL IMAGE PROCESSING

This application is a Continuation of U.S. Ser. No. 15/935,043, titled "High Density Parallel Proximal Image Processing," filed Mar. 25, 2018, the disclosure of which is incorporated herein by reference in its entirety.

FIELD OF INVENTION

The present invention relates generally to image capture and processing, and in particular to a system and method of image capture and processing featuring distributed computational circuits proximal or dedicated to associated pixels and performing basic pixel processing computations in parallel.

BACKGROUND

Digital image capture and processing has all but replaced film photography. In a familiar cycle of technological advancement, improvements in the state of the art of image sensors, sophisticated image processing algorithms, and more powerful processing platforms on which to execute them, continuously improve the resolution, quality, and flexibility of digital image capture. This drives the demand for ever higher-quality digital imaging in a broad array of applications, enabling economies of scale that drive down costs, which further prompts wider deployment and the expectation of improved imaging with each product generation. No longer limited to conventional photography (e.g., still and video cameras—an increasingly irrelevant distinction), high-resolution, color, digital image sensors are widely deployed in smart phones, conventional and tablet computers, vehicles, unmanned aerial vehicles (drones), and the like. Indeed, a large segment of the drone market is most accurately characterized as simply an aerial platform for the deployment of high-res digital cameras.

Due to economic incentives to use a few universal elements and due to a wide variety of applications with different sensing and processing requirements, conventional imaging systems typically comprise an image device, a high speed bus for image data transfer, a highly programmable general purpose computing device, a memory system, advanced memory controls, and sometimes a computational accelerator/co-processor, all connected on a circuit board operable to allow communications and coordinated function between these modular elements. Keeping the image device, computing devices and memory system distinct and separate has the advantage of being very flexible, but imposes extreme requirements for high data transfer speeds, central computing power, electrical power, cost and circuit space. Optimizing modularity and flexibility requires sacrificing system optimality.

The heart of digital imaging is the image sensor, or Focal Plane Array (FPA). An image sensor comprises a 1- or 2-dimensional array of pixels, or photosensitive elements. Each pixel is responsive to photons within a band of the electromagnetic spectrum, in such a manner as to produce an electric signal upon exposure to that band of radiation. An image sensor may comprise a CMOS or CCD FPA, an active pixel sensor, a microbolometer array, or the like, and it may be adapted to be sensitive to one or more colors (wavelengths), such as monochrome, Red-Green-Blue (RGB), Bayer pattern, RGB-Clear, RGB-NIR, near infra-red (NIR), shortwave infra-red (SWIR), mid-wave infra-red (MWIR), longwave infrared (LWIR) or ultra-violet (UV).

As digital image sensor technology improves, sensor pixel counts increase dramatically in response to demand for ever higher resolution images to more accurately reflect real scenes. Even a "small" imager may comprise a million pixels. A state of the art smartphone has two 12-Mexapixel sensors facing one direction, and a 7-Megapixel sensor facing the other. Even simple, low-level image processing—for example, the absolute difference between a current pixel value and the last frame value for the same pixel—becomes a significant computational task for 12 million pixels at 30 frames per second.

FIG. 1 depicts a conventional image capture and processing system 10. A charge is accumulated for each pixel in a pixel array 12. These charges are converted to a binary digital value (typically 8, 10, 12, 14, or 16 bits)—either serially via an Analog-to-Digital Converter (ADC) 13 for the entire sensor, at each column or row, or in some cases at each pixel. These one- or two-byte digital values are then read out and transferred off the image sensor via a high speed serial or parallel bus 14 to an external CPU 16 (microprocessor, Digital Signal Processor, field programmable gate array (FPGA), ASIC, etc.). The sheer volume of data to be transferred imposes constraints on the achievable frame rate of the sensor. This can be mitigated with faster buses 14, and/or with interline frame stores (a type of buffer), all of which increase complexity, cost, power consumption, and/or size. The CPU 16 must store the pixel data (or the outputs of calculations performed "on the fly") to memory 18 via memory bus 17. In some cases, a Direct Memory Access (DMA) function 20 can offload the data storage to memory 18, allowing the CPU 16 to perform other operations concurrently.

In some cases, some image processing functions such as global histograms and Debayer (a spatial resample and color space transformation for sensors with Bayer color filter arrays) are performed in pre-processing circuits 22, typically on the periphery of the image sensor chip, as the pixel data are being read. Still, the (processed) digital pixel values must be transferred off-chip to the CPU 16 and memory 18 for the other image processing routines which are typically involved in machine vision or computer vision applications.

For subsequent algorithms to be performed, pixel data must be read from the memory 18 at least once, and processed by the CPU 16 running fixed or floating point math. Intermediate values are often stored back to memory 18, which may be main memory, tightly coupled memory, or data cache memory, and then output values are also. It is not uncommon for the number of memory reads and writes per pixel to rival or exceed the number of arithmetic operations performed per pixel, so memory bandwidth can also become a performance limitation. That can be mitigated with wider memory buses 17, hierarchical memory structures including large caches in the CPU 16 or interposed between the CPU 16 and memory 18, faster memory clocks, memory compression techniques, and the like. However, all of these approaches impose the price of increased complexity, cost, power consumption, and/or size.

In more complex algorithms, the number of computations per pixel may exceed the number of memory reads and writes per pixel; in this case, computational speed can become a performance limitation. This can be mitigated with faster processor speeds, greater parallelism from multi-core, SPMD, SIMD, or other architectures, the use of dedicated hardware (e.g. on chip ASIC blocks) for some functions, use of a computational accelerator/co-processor such as a GPU, and the like. However, these all carry the price of increased complexity, cost, power consumption, and/or size.

In modern image processing systems, a combination of large image sensor element arrays, the need to run many algorithms with per-pixel computation, and the required transmission, storage and retrieval operations on digital data moving between discrete, dedicated modules for sensing, storage, and processing, all result in substantial complexity, cost, power consumption, and/or size, along with limitations, restrictions, and often corruption to the raw data itself. This cost and complexity is an inexorable consequence of the size of pixel arrays required to capture and generate high-res video, and the volume and complexity of image processing required to either render aesthetically pleasing video (color, contrast, saturation, dynamic range, etc.) or perform sophisticated analysis of the content (object detection and classification, facial recognition, etc.).

Many applications, in which image/video capture and analysis may be advantageously employed, do not require either very high resolution or very complex/sophisticated image processing. For example, occupancy detection and tracking may be employed for automated lighting, access, and HVAC control, without the need for identification of the persons detected. Not only is relatively low resolution image capture sufficient for this class of applications, but the image processing required is often characterized by relatively simple, pixel-level operations, such as comparison, averaging, and the like.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to embodiments of the present invention described and claimed herein, a distributed, parallel, image capture and processing architecture provides significant advantages over prior art systems, such as that depicted in FIG. 1. A very large array of computational circuits—in some embodiments, matching the size of the pixel array—is distributed around, within, or beneath the pixel array of an image sensor. Each computational circuit is dedicated to, and in some embodiments is physically proximal to, one, two, or more associated pixels. Each computational circuit is operative to perform computations on one, two, or more pixel values generated by its associated pixels. The computational circuits all perform the same operation(s), in parallel. In this manner, a very large number of pixel-level operations are performed in parallel, physically and electrically near the pixels. This obviates the need to transfer very large amounts of pixel data from a pixel array to a CPU/memory, for at least many pixel-level image processing operations, thus alleviating the significant high-speed performance constraints placed on modern image sensors.

One embodiment relates to an imaging circuit. The imaging circuit includes an array of pixel sensors. Each pixel sensor is operative to generate a pixel value in response to incident photons. The array of pixel sensors is arranged in rows and columns. The imaging circuit also includes a plurality of Analog to Digital Converters (ADC) disposed adjacent said pixel sensor array, along at least one side of one or both of said rows and columns. The plurality of ADCs is configured to digitize pixel values. The imaging circuit further includes a plurality of computational circuits operating in parallel. Each computational circuit is disposed proximate to said ADCs and is configured to perform one or more computations on one, two, or more digital pixel values.

In some embodiments the plurality of computational circuits comprises a plurality of combinatorial, sequential, or arithmetic computational circuits. The number of combinatorial, sequential, or arithmetic computational circuits may equal the number of rows or columns, and each combinatorial, sequential, or arithmetic computational circuit, other than those at either end, may receive input from the associated row or column, and both immediately adjacent rows or columns.

In some embodiments, memory is associated with each row or column, and is operative to store at least three successive pixel values as the pixel values are shifted out of the row or column. Each combinatorial, sequential, or arithmetic computational circuit, other than those at either end, may receive as input the current and previous two pixel values for the associated row or column, and both immediately adjacent rows or columns. Each combinatorial, sequential, or arithmetic computational circuit may be an Arithmetic Logic Unit (ALU), or may be implemented as a programmable logic block.

In some embodiments, the one, two, or more pixel values may comprise a past and a current value generated by the same pixel. The incident photons may comprise visible light, ultraviolet light, near infrared light, or thermal infrared radiation.

The one or more computations may, in different embodiments, relate to an algorithm, or portion thereof, selected from the non-limiting group consisting of a stretch operation, a scalar multiply, add, subtract or divide operation, optical flow, Sobel edge detection, Difference of Gaussians gradient detection, histogram of gradients, Canny Corners, H.264/265 encoding, JPEG encoding, demosaic, debayer, motion detection using Gaussian Mixture Model, n-frame differencing, differential encoding, jitter detection/suppression, vibration detection/suppression, flicker detection/suppression, LiFi demodulation/decode, digital infinite impulse response filter, digital finite impulse response filter, Goertzel filtering, temporal FFT, spatial FFT, local area median, 1D or 2D Gaussian blur, Unsharp Mask, 1D or 2D box filter, running average, regional running average, and regional running average of differences.

In some embodiments, a group may comprise an n×m zone of pixel sensors, where n and m are integers. Performing one or more computations on two or more pixel values may comprise downsampling the n×m zone of pixel values to one pixel value. Each group of pixels may comprise a square region of pixel sensors.

In some embodiments, the imaging circuit includes a plurality of light sources and a controller connected to the light sources and the arrays of pixel sensors and computational circuits. The controller may be operative to receive image-processed information from the outputs of the computational circuits, and may be further operative to control the plurality of light sources in response to the image-processed information. The controller may be further connected to a network of two or more imaging circuits including light sources.

Another embodiment relates to an imaging circuit. The imaging circuit includes an array of pixel sensors. Each pixel sensor is operative to generate a pixel value in response to incident photons. The array of pixel sensors is arranged in rows and columns. The imaging circuit also includes a plurality of Analog to Digital Converters (ADC), each associated with a row or column, and configured to digitize pixel values. The imaging circuit further includes a plurality of computational circuits operating in parallel. Each computational circuit is associated with an ADC and is configured to perform one or more computations on one, two, or more digital pixel values.

Yet another embodiment relates to a control system. The control system includes a plurality of imaging circuits. Each imaging circuit includes an array of pixel sensors. Each pixel sensor is operative to generate a pixel value in response to incident photons. The array of pixel sensors is arranged in rows and columns. Each imaging circuit also includes a plurality of Analog to Digital Converters (ADC) disposed adjacent said pixel sensor array along at least one side of one or both of said rows and columns, and configured to digitize pixel values. Each imaging circuit further includes a plurality of computational circuits operating in parallel. Each computational circuit is disposed proximate to said ADCs and is configured to perform one or more computations on one, two, or more digital pixel values. The control system further includes a controller operative to receive and further process image-processed information from each imaging circuit. The controller is further operative to control one or more devices in response to the information.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Embodiments of the present invention provide an array of relatively simple computational circuits that are distributed around or beneath a pixel array, and that operate in parallel to perform low-level image processing tasks. Each computational circuit is dedicated to (and in some embodiments proximate to) one or more associated pixels. In some embodiments, the computational circuits operate in the analog domain, on one, two, or more analog pixel values. In other embodiments, at least some computational circuits include ADCs, and operate in the digital domain on one, two, or digital pixel values. In both cases, all computational circuits perform the same operations in parallel. Because there is no need to move massive amounts of pixel data from a pixel array to a remote CPU to perform these computations, and because these computations are performed by many circuits in parallel, the timing constraints of conventional image processing systems are dramatically reduced.

FIGS. 2-7 depict various embodiments. The block diagrams of these drawing figures are high-level and conceptual, and are not intended to depict accurate details of actual circuits. For example, peripheral circuits such as power supply generation and regulation 36, 46, 56, 66, clock generation and distribution 37, 47, 57, 67, and Input/Output (I/O) 38, 48, 58, 68 are depicted on each integrated circuit 30, 40, 50, 51, 60, 61. These are representative only, and are not exhaustive. For example, hardware blocks may implement wired communication (e.g., I2C), wireless communication (e.g., Bluetooth), or numerous other well-known functions (e.g., real-time clock, internal bus arbitration, en/decryption, etc.). Such circuits will vary with each implementation, and are omitted from FIGS. 2-7 for clarity.

Figure 2:
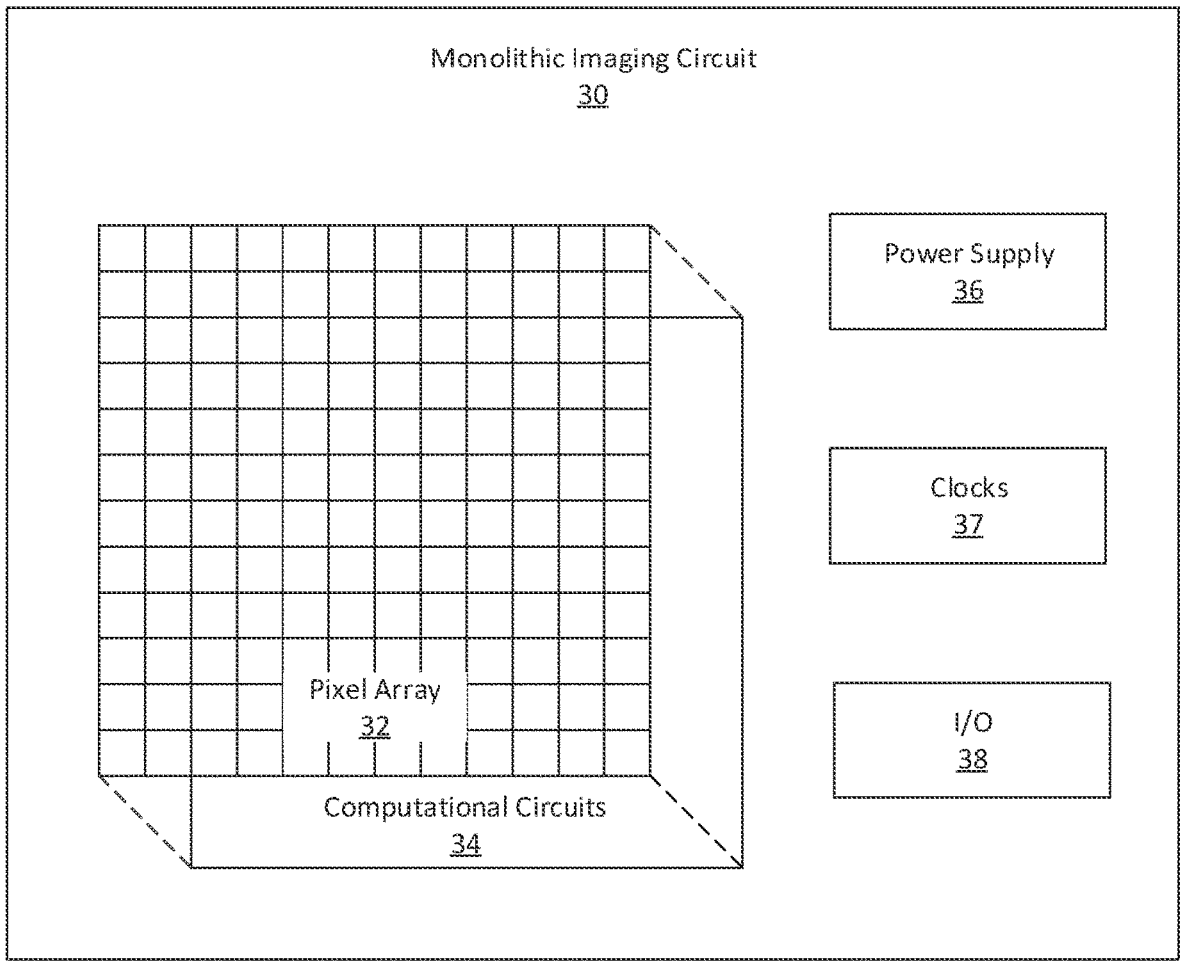
FIG. 2 is a block diagram of a pixel array overlaying an array of computational circuits on a monolithic imaging circuit.

FIG. 2 depicts one embodiment of a monolithic imaging circuit 30, wherein an array of computational circuits 34 (analog, digital, or hybrid) is located beneath the pixel array 32. For example, the computational circuits 34 may be embedded in semiconductor layers prior to formation of the pixel array 32. In this embodiment, connection between pixels and associated computational circuits 34 is by metallization layer wiring. These conductors are very short, and hence avoid common IC layout challenges, such as stray capacitance, transmission line ringing, clock skew, and the like. In the case that some or all of the computational circuits operate in the digital domain, ADCs (not shown) may be provided on a per-pixel basis, along with the computational circuits. Alternatively, where the computational circuits operate in the analog domain, the pixel values may connect directly to the computational circuit 34 inputs.

Figure 3:
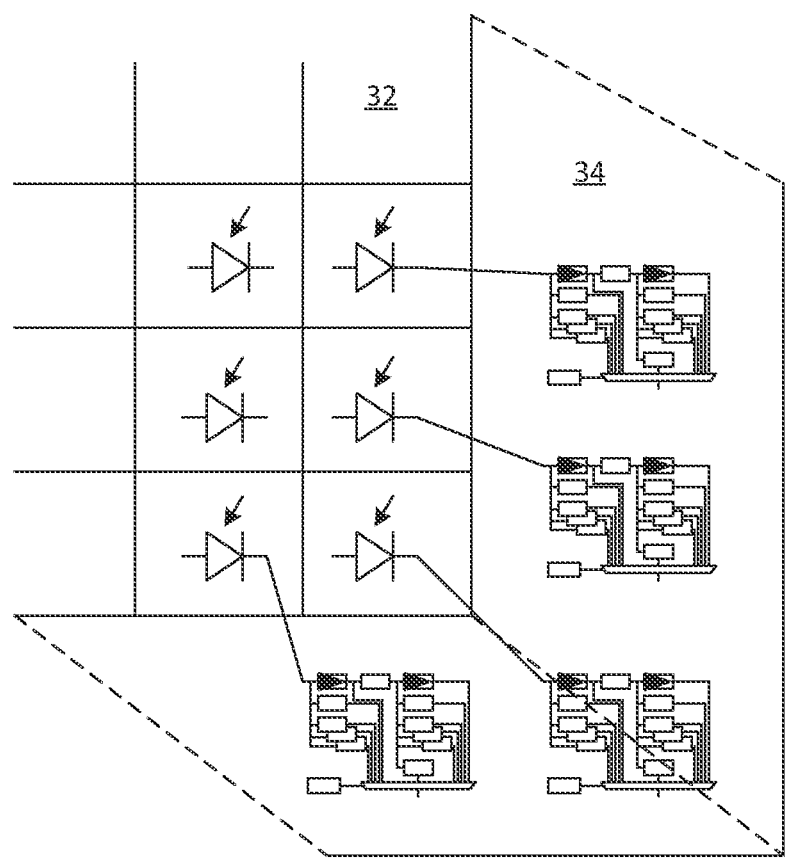
FIG. 3 is an enlarged view of the pixel and computational circuit arrays of FIG. 2, showing one computational block per pixel.
Figure 9:
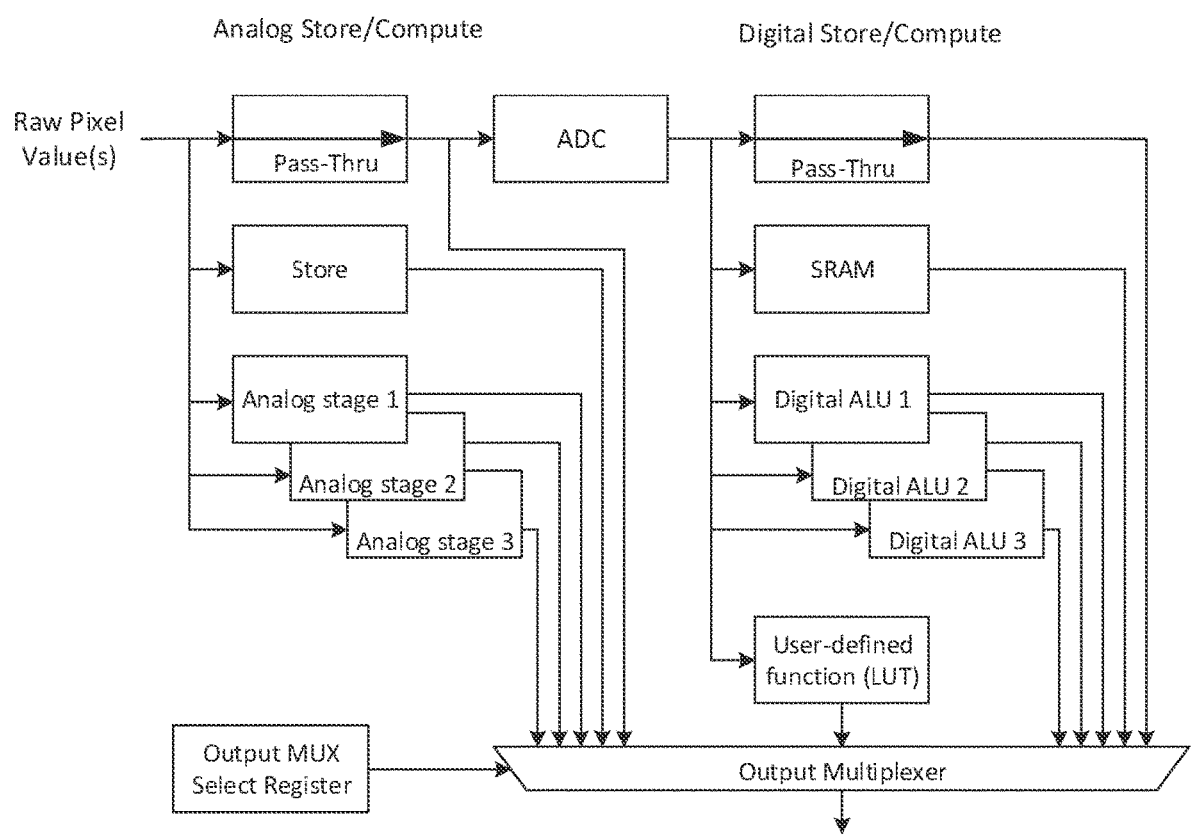
FIG. 9 is a block diagram of a computational block including analog and digital storage and computational functions, with selectable outputs.

FIG. 3 depicts an enlarged view of the circuit 30 of FIG. 2 according to one embodiment, in which each pixel in the pixel array 32 is connected to a separate computational circuit 34. The computational circuits 34 are computational blocks comprising both analog and digital storage and processing functions (depicted in greater detail in FIG. 9 and described more fully herein). In this embodiment, there are as many computational blocks in the computational circuit array 34 as there are pixels in the pixel array 32.

Figure 4:
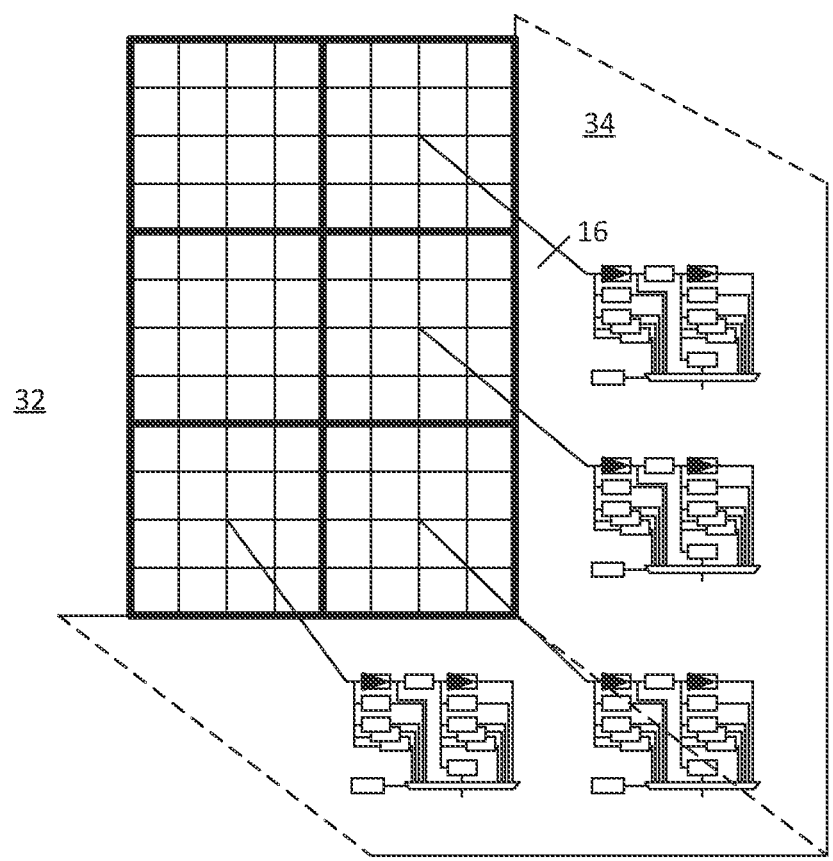
FIG. 4 is an enlarged view of the pixel and computational circuit arrays of FIG. 2, showing one computational block receiving input from 4×4 groups of pixels.

FIG. 4 depicts an enlarged view of the circuit 30 of FIG. 2 according to another embodiment, in which a fixed or variable group of pixels in the pixel array 32 are connected to a computational circuit 34. In this particular example, the pixel group, or block, is 4×4, for 16 pixels. As shown, each computational circuit 34 receives 16 inputs. In various embodiments, the pixel groups may be of any dimension, and need not be square (e.g., 2×2, 3×5, etc.). In some embodiments, the pixel groupings are fixed, and the pixels of each group are hardwired to their respective computational circuit 34. In other embodiments, the pixel groupings are dynamically determined, for example in response to the processed image data (e.g., object tracking). In these embodiments, an appropriate switching matrix (not shown) would be interposed between the pixel outputs and the computational circuit 34 inputs, to route the pixel values of each dynamically determined group to the same computational circuit 34. Such dynamic switching control is well within the skill of those of skill in the art, without undue experimentation, and is not elaborated further herein.

Figure 5:
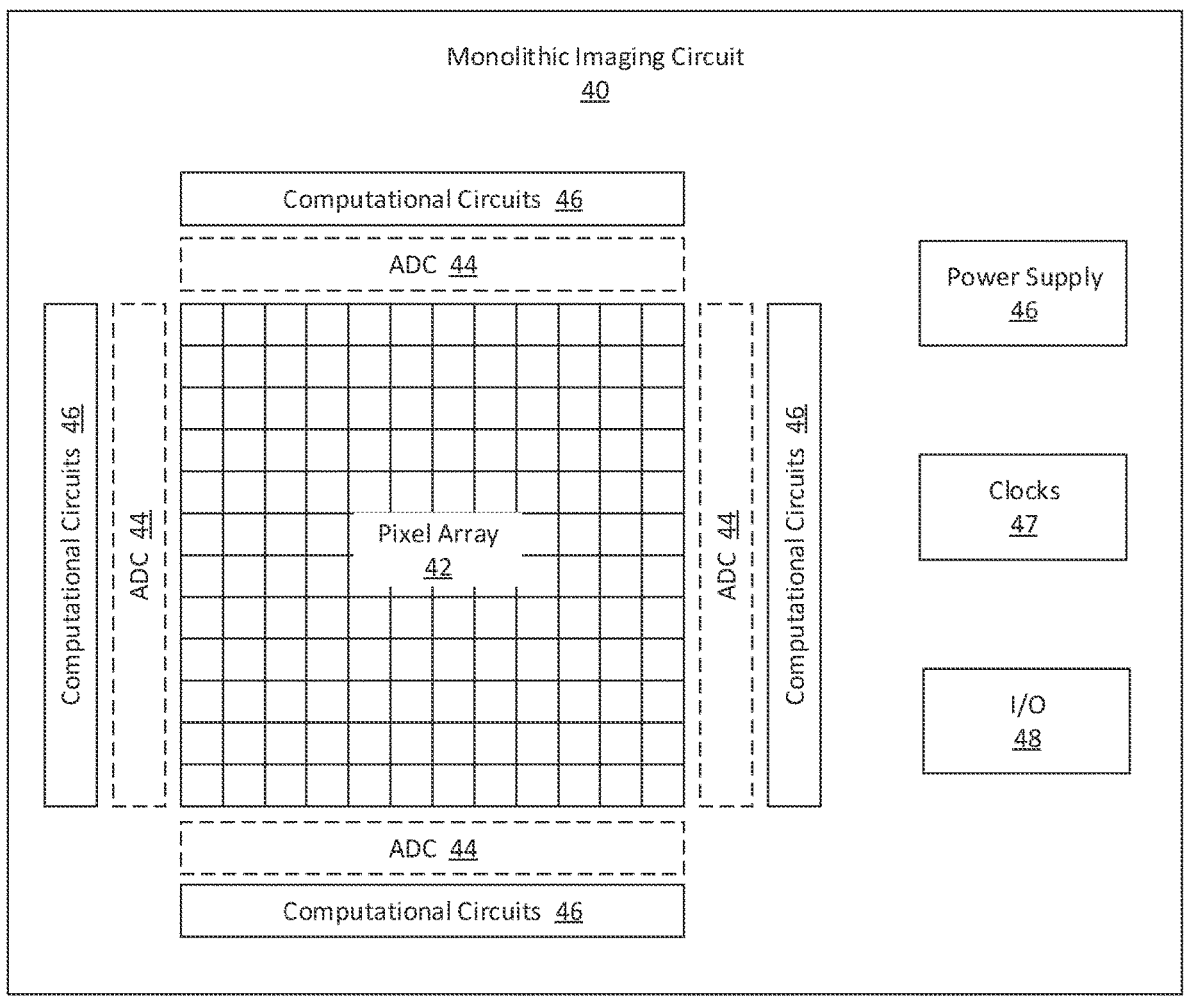
FIG. 5 is a block diagram of an array of computational circuits disposed around a pixel array on a monolithic imaging circuit.

FIG. 5 depicts another embodiment of a monolithic imaging circuit 40, wherein arrays of computational circuits 46 (analog, digital, or hybrid) are located around the sides of the pixel array 42. In embodiments where the computational circuits are digital, ADCs 44 may be interposed between the pixels array 42 and the computational circuit arrays 46, as shown. Alternatively, the ADCs 44 may be provided per-pixel, integrated within the pixel array 42. In embodiments where the computational circuits 46 operate exclusively in the analog domain, no ADCs 44 need be provided. While this embodiment introduces routing challenges in the connection of pixels to their associated ADCs 44 or computational circuits 46, it may be appropriate for less sophisticated or less expensive semiconductor processes, as fewer layers are required. However, the parallel computational circuits 46 are still distributed very close to their associated pixels, as compared to the prior art systems such as FIG. 1.

Figure 6:
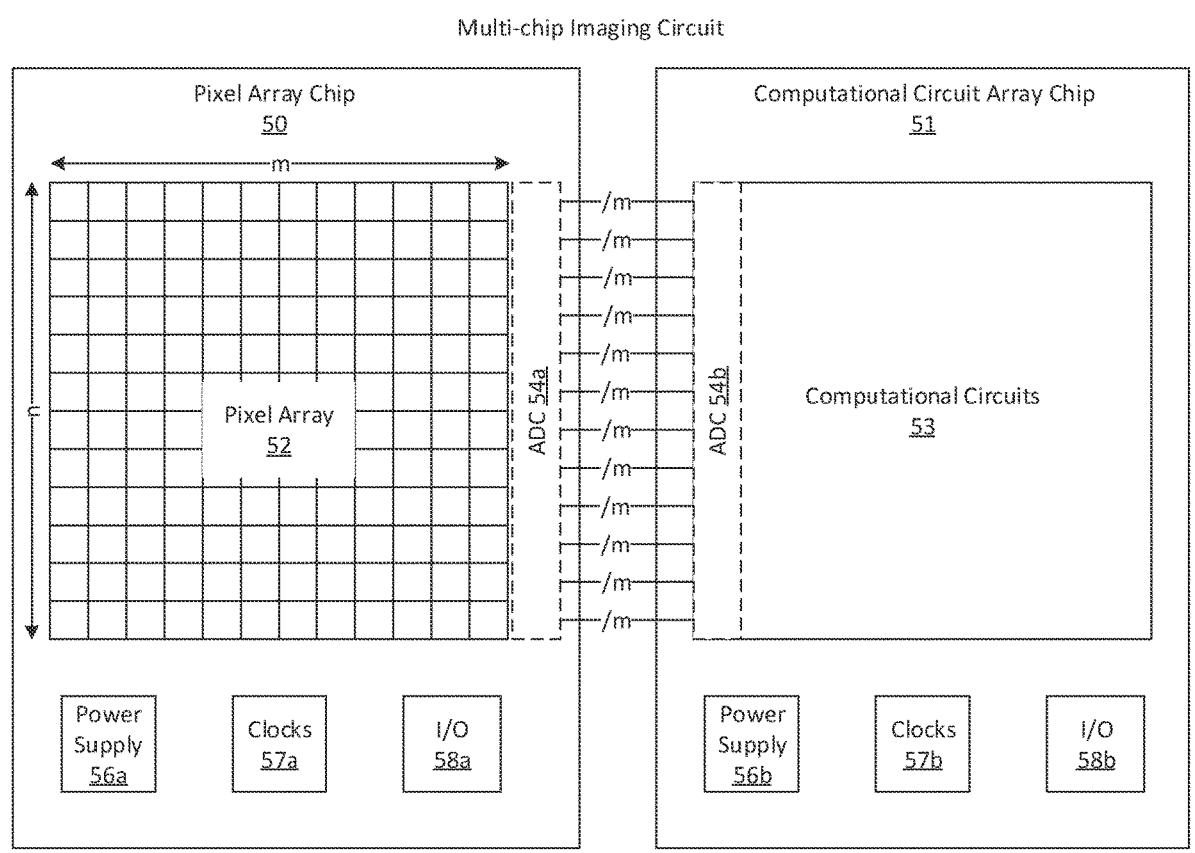
FIG. 6 is a block diagram of a multi-chip imaging circuit wherein a pixel array and array of computation circuits are located on different chips, with a plurality of direct electrical conductors connecting pixels with associated computational circuit inputs.

FIG. 6 depicts one embodiment of a multi-chip imaging circuit, in which the pixel array 52 is located on a pixel array chip 50, and the array of computational circuits 53 (analog, digital, or hybrid) is located on a separate computational circuit array chip 51. These two arrays 52, 53 are connected by a large number of direct electrical conductors connecting each computational circuit to its two or more associated pixels. As indicated, ADCs 54a, if necessary, may be located on chip 50 with the pixel array 52 (in some embodiments, within each pixel). Alternatively, the interconnections may be analog, with the ADCs 54b co-located on the computational circuit array chip 51. While the computational circuits 53 are physically remote from the pixel array 52, in that they are on a separate chip 51, the computational circuits 53 are electrically distributed, as each is connected directly to the pixels on which it operates, in contrast to the remote CPU of FIG. 1, in which a single computational circuit operates on every pixel value.

Figure 7:
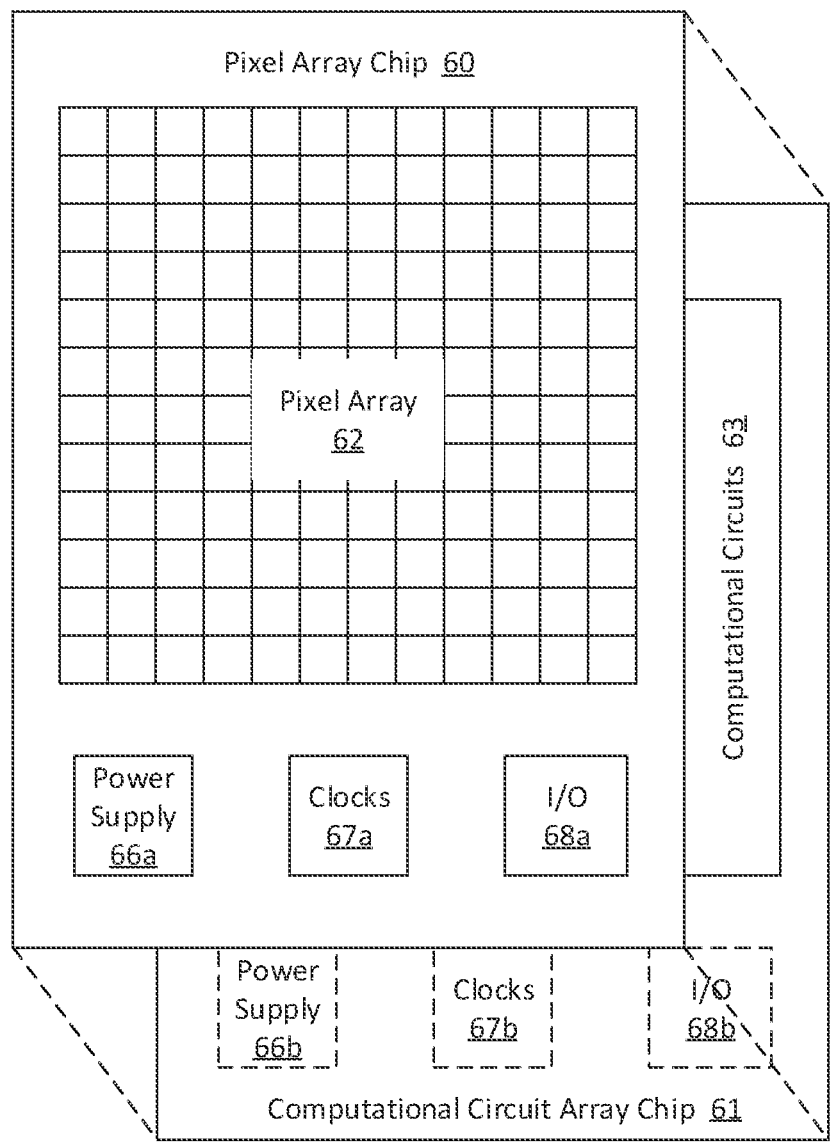
FIG. 7 is a block diagram of a multi-chip imaging circuit wherein a pixel array and array of computation circuits are located on different, overlapping chips with pixel-to-computational-circuit interconnects between the chips.

FIG. 7 depicts another embodiment of a multi-chip imaging circuit, in which the pixel array 62 is located on a pixel array chip 60, and the array of computational circuits 63 (analog, digital, or hybrid) is located on a separate computational circuit array chip 61. In this embodiment, the integrated circuits 60, 61 are "stacked," with a large number of interconnection conductors connecting each computational circuit 63 to its two or more associated pixels. Stacked-chip packaging is a well-developed technology in the integrated circuit arts, using for example flip chip, 3-D wafer level packaging, package on package (PoP) configurations, and the like. ADCs, if necessary, may be co-located with each pixel on the pixel array chip 60, or may be co-located with each computational circuit on that chip 61. As indicated by dashed lines, the peripheral circuits 66, 67, 68 may be provided on both integrated circuits 60, 61; alternatively they may only be necessary on one integrated circuit 60, with interconnections supplying the power, clocks, etc. to the other integrated circuit 61.

The imaging circuits of embodiments of the present invention feature a distributed, parallel array of computational circuits, that are tightly coupled to pixels in the pixel array. The computational circuitry performs pixel-level operations (logical, sequential, or arithmetic) of image processing algorithms. Particularly for fixed- or variable-block based image processing algorithms, each instance of computational circuitry may directly receive the values (analog or digital) from a corresponding block of pixels. As another example, an instance of computational circuitry may operate on two or more pixel values, where one value is a current value of a particular pixel, and the other pixel values are stored values generated by the same pixel in one or more prior frames (e.g., averaging pixel values, or calculating frame-to-frame differences).

By performing computational operations in parallel, close to the pixels, the requirement of prior art system of transferring massive amounts of pixel data is obviated. Since moving this data from the pixel array 12 to a CPU 16, and between the CPU 16 and memory 18, drives the need for high-speed circuitry, the distributed, parallel computational circuits of embodiments do not have high-speed requirements.

Figure 1:
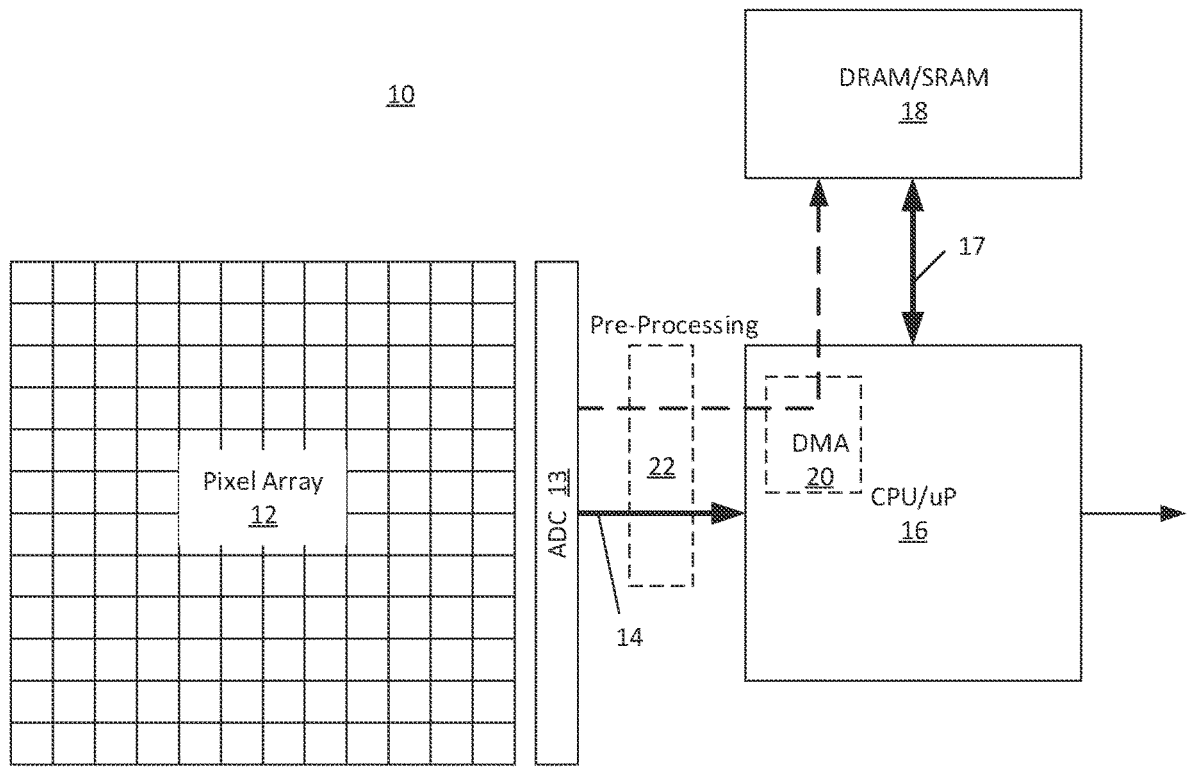
FIG. 1 is a block diagram of a prior art image capture and processing system.

Prior art image capture and processing systems, such as the one depicted in FIG. 1, may be characterized as: central, remote, modular, general-purpose or programmable, serial, very fast, and digital. In contrast, image capture and processing architectures according to embodiments described herein are characterized as distributed, local, integrated, function-specific, parallel, not necessarily fast, and analog or hybrid analog/digital. Each of these properties is described and contrasted.

Central—Distributed

Most or all computational circuits in the system depicted in FIG. 1 are centralized in the CPU 16. In variations, they may be distributed between the CPU 16 and numerical or graphic co-processors, function-specific ASICs, etc., however, the vast amount of computational power is still centralized (This is necessarily so, as all pixel data is stored in memory 18).

In contrast, in embodiments of the present invention, computational circuits are distributed around, or beneath, the pixel array. For example, in the embodiments of FIGS. 2 and 7, the computational circuits are located beneath the pixel array 12. This allows for straightforward, direct connection of each computational circuit to its one, two, or more associated pixels. In the embodiment of FIG. 5, the computational circuits are distributed around the pixel array, also allowing for relatively short, direct connection of each computational circuit to its associated pixels. Even in the embodiment of FIG. 6, the array of computational circuits is distributed near the pixel array 12, as compared to the remote CPU of FIG. 1.

Remote vs. Local

Most of the computational circuits, such as the CPU 16, in the system depicted in FIG. 1 are remote from the pixel array 12. This results in the data bus connecting them being a significant bottleneck, limiting performance due to the massive number of pixel values. Even the pre-processing circuits 22, when present, are remote from the pixels generating the values on which they operate.

In contrast, in embodiments of the present invention, computational circuits are local to the pixels that generate pixel values. For example, in the embodiment of FIGS. 2 and 7, the computational circuits are located beneath the pixel array 12. Even in the embodiments of FIGS. 5 and 6, the computational circuits are electrically local to their associated pixels, in the sense that each computational circuit is directly connected to the one, two, or more pixels generating the pixel values on which it operates.

Modular vs. Integrated

In the system depicted in FIG. 1, the CPU 16, the memory 18, and even the pre-processing circuits 22 are modular components that can easily be switched to conform with the processing speed and computational workload of any given application. For example, with a relatively smaller pixel array 12, a slower CPU 16 can be used, assuming the image processing task is tractable. As the pixel array 12 size increases, and/or as more sophisticated image processing is required for any given application, a faster and/or more powerful CPU 16 may be required. Similarly, the size and/or speed of the modular memory 18 can be scaled to the demands of a particular application.

In contrast, in embodiments of the present invention, computational circuits are tightly coupled and integrated to the pixels that generate pixel values, either singly or in groups of 2, 3 or more. While the number of computational circuits will scale with the pixel array 12 size, the functionality of each computational circuit is fixed. If, for example, in a particular application the computational circuits perform analog intensity average over n frames, parameters for that algorithm such as the weighting factors for frames of different ages may be adjust through register settings, but the underlying algorithm cannot generally be altered by reprogramming. In other words, for any given implementation, the computational circuits are tightly integrated with the pixels and optimized for a specific purpose, and cannot be arbitrarily altered as is the case for more modular designs.

General-Purpose vs. Function-Specific

The CPU 16, and memory 18 of FIG. 1 is, by design, a general-purpose computational resource, which may be used for an array of applications including those complete unrelated to imaging systems. A broad variety of image processing algorithms may be performed on the pixel data, simply by reprogramming the CPU 16. While this is an essential feature of modern processors, it comes at the cost of complex circuitry, such as a register files, stacks, numerous configurable pipeline paths, memory management (virtual to physical address translation, lookaside buffer, page tables, etc.), and the like. Such general-purpose circuitry adds complexity, cost, and power consumption.

In contrast, in embodiments of the present invention, computational circuits have a fixed, predetermined and generally simple functionality. In some embodiments, as explained in greater detail herein, two or more functions may be provided in a computational block; however, the computational circuits within such blocks are each fixed, and can perform only one function. While obviously limited in generality, such function-specific computational circuits have a large beneficial impact in arrays by virtue of high parallelism and are highly efficient, very small, and consume little power. In one embodiment, a user-defined function, such as a look-up table, provides flexibility and re-programmability, but is still a dedicated, pixel-level functionality, in contrast to a general-purpose, programmable CPU.

Serial vs. Parallel

Although some CPUs 16 feature parallel architectures (e.g., SIMD units and superscalar pipelines), from a system perspective, they process pixel data serially. Whether the bus 14 is serial or parallel, pixel data are shifted out of the pixel array 12 a row or column at a time, and transferred to the CPU 16 one after the other. Particularly for the very large volumes of pixel data generated by large modern pixel arrays, this serial transfer and processing requires very high speed circuits (expensive and power hungry) to process the data.

In contrast, in embodiments of the present invention, the computational circuits are massively parallel. Indeed, in some embodiments they are fully parallel—one or more computational circuits are associated with each individual pixel.

High-Frequency vs. Relatively Low Frequency

As discussed above, the sheer volume of pixel data generated by modern pixel arrays requires very high-speed buses 14, 17, CPU 16, and memory 18 to simply move the data, as well as perform low-level, per-pixel (or per-pixel-group) computations at required frame rates. Similarly, the higher-level image processing performed in the CPU 16 requires the implementation of sophisticated algorithms on a massive quantity of processed pixel/image data, also at required frame rates. As a representative yet modest example, consider a moderate-resolution, by modern standards, 5 Megapixel array, with each pixel value quantized into one byte. At a slow frame rate of 10 fps (sufficient for motion detection, for example, but far below the frame rate required for consumer video), the bus 14 in FIG. 1 must transfer 50 Mbytes/sec. A simple image processing algorithm performing only 10 operations per pixel may perform memory 18 read/write operations several hundred Mbytes/sec (assuming the CPU 16 retains some results as input to subsequent operations). This requires non-trivial high-speed circuits, not only in the CPU 16, but also the memory 18 and arbitration/control circuits for the buses 14, 17. These circuits are costly, and in operation consume considerable power, generating considerable heat.

In contrast, in embodiments of the present invention, the computational circuits are distributed among, or close to, the pixels of the pixel array, and very large numbers of them operate in parallel. In the above case of 10 pixel-level operations per frame, the computation rate is only 10× the frame rate, or 100 ops/sec—spread over up to several million computational circuits. In many cases, the pixel-level computations decimate the data—for example averaging blocks of pixels, or converting small blocks of pixels to a single multi-color pixel value. Hence, transferring the intermediate or final results to a conventional image processing or general-purpose CPU for higher-level, image-wide computation does not require nearly the data rate of the system of FIG. 1.

Digital vs. Analog or Hybrid Analog/Digital

The prior art image processing system of FIG. 1 operates almost entirely in the digital domain. High-speed ADC circuits digitize pixel values as they are shifted out of each row or column of the pixel array 12, or in some cases may be provided at each pixel location. However, early digitization may introduce errors. The charge accumulated in each pixel is converted to a binary digital value (typically 8, 10, 12, 14 or 16 bits) by a per-row/column or per-pixel ADC. Some noise is introduced to the signal when this conversion is done, a finite digital resolution is imposed aliasing the raw signal, and the finite range of digitization typically either clips the signal or underutilizes the finite digital bits available. Thus, some computations performed in the analog domain may be more accurate, as they work with the charge stored in a pixel capacitor, prior to quantization errors introduced by digitization.

In contrast, in embodiments of the present invention, some computational circuits may work with analog pixel values. For example, the accumulated charge stored in capacitors associated with a plurality of pixels may be summed by transferring the charge to a single, larger capacitor located beneath a pixel block of the pixel array 12. As another example, second and third capacitors may be provided at each pixel value, with the charge from an initial exposure (e.g., frame) being transferred to the second capacitor prior to the pixel capacitor being cleared for a subsequent exposure. Frame-to-frame comparisons may then be performed by comparing the voltages on the capacitors, e.g., in an operational amplifier. In some embodiments, the distributed, parallel computational circuits may include ADC circuits and memory, and may operate in the digital domain. In some embodiments, digitized pixel values may further by Digital-to-Analog converted back to the analog domain, for further processing, such as with more recent analog pixel values. The flexibility of performing pixel-level computational operations (that is, operating on one, two, or more pixels) in the analog, digital, or hybrid analog/digital domain allows for greater control over the accuracy of such calculations, as well as trade-offs over cost and complexity.

With this general view of the nature of embodiments of the present invention, specific embodiments of the invention will now be described. These embodiments are not limiting, but rather are presented solely as representative examples of the possibilities of distributed, parallel pixel-level image processing according to the broad concept of the present invention.

Per-Row or -Column Digital ALUs

Figure 8:
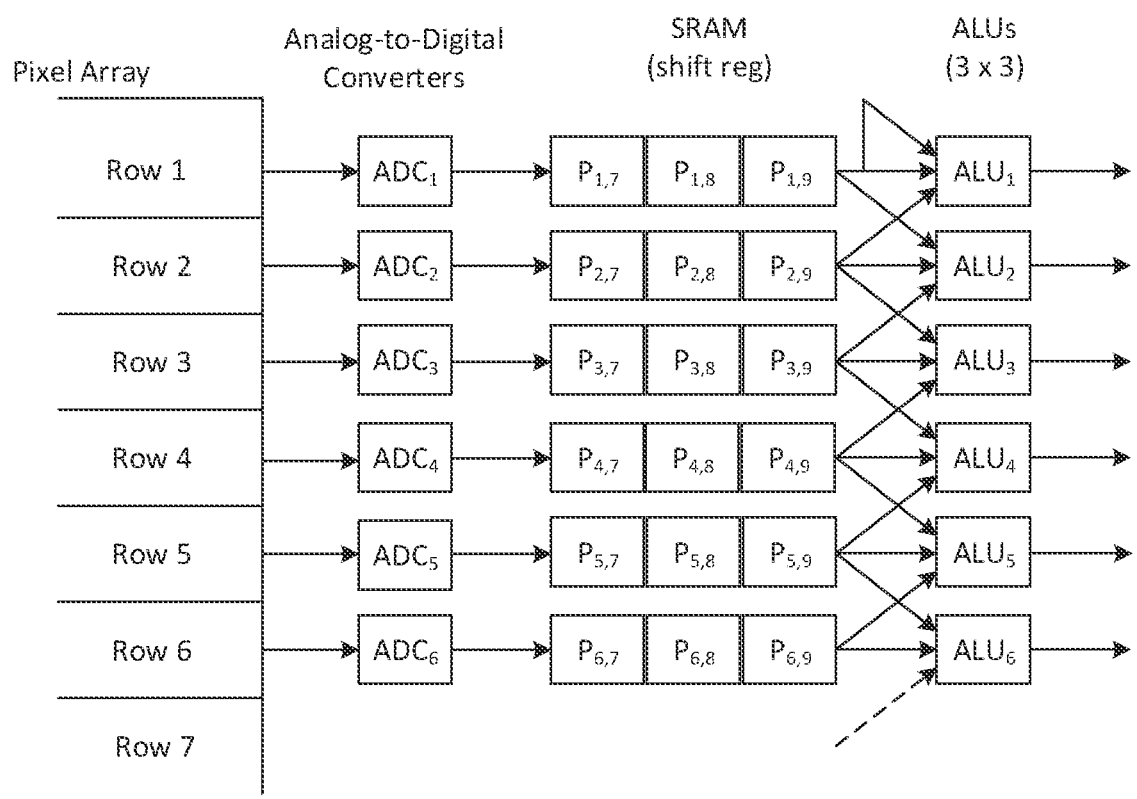
FIG. 8 is a block diagram of one embodiment where the computational circuits comprise 9-element ALUs arrayed along one side of the pixel array.

FIG. 8 depicts one possible implementation of the general architecture depicted in FIG. 5 (also applicable to FIG. 6). In this embodiment, the computational circuits operate in the digital domain, and comprise combinatorial, sequential, or arithmetic computational circuits. In the embodiment depicted, the combinatorial, sequential, or arithmetic computational circuits are represented by Arithmetic Logic Units (ALU).

ADCs digitize analog pixel values as they are shifted out of the pixel array, and 3-pixel (e.g., 3-byte) SRAM cells locally store the digitized pixel values. The SRAM is configured as a shift register, wherein successive pixel values are shifted to the right as new pixels are shifted out of the pixel array. Note that, as indicated on row 6, the all three pixel values of each row's SRAM are provided as inputs to the associated ALU (as well as those associated with the rows above and below). Each 9-element ALU operates on a 3×3 matrix of pixel values. In particular, each ALU operates on three successive pixels (that is, the pixels from three adjacent columns of the pixel array, stored in the local SRAM) from each of three rows of the pixel array—the ALU's associated row, and both rows immediately adjacent (i.e., the row above and the row below). As a non-limiting example, ALU1 receives pixels from row 1 at two of its inputs, there being no "upper row" data. In other embodiments, it may be the pixel from row 2, or from the last row or the array, it may simply be tied high or low. A similar situation exists at the last row in the array. Such implementation details are well within the skill of those of ordinary skill in the art.

In one embodiment, the ALUs are implemented as programmable logic blocks, such as a "sea of gates" or a Field Programmable Gate Array (FPGA) block. Programmable logic offers the benefits of hardware speed, but allows for changes in the combinatorial, sequential, or arithmetic functions performed on the pixel values. In other embodiments, where the desired functionality is known and fixed, the ALUs may be implemented as dedicated hardware.

In other embodiments, each pixel location in the pixel array may include an ADC and pixel storage (e.g., one or two byte SRAM). In this case, a multiplexer or switching matrix is required to route the digital pixel values to the relevant ALUs.

Computational Block

FIG. 7 depicts one embodiment of a computational circuit in the array of computational circuits. In this embodiment, the computational circuit comprises a computational block, having both analog and digital store and compute components. An analog compute/store block includes a pass-through option, analog storage (e.g., a capacitor), and one or more analog computation blocks, or stages. For example, a large capacitor may sum the voltages representing a plurality of raw pixel input values. The computational block also includes a digital compute/store block, which includes one or more ADCs to digitize the raw pixel value(s). Memory is operative to store the digital pixel value(s), and one or more digital combinatorial, sequential, or arithmetic computational circuits, such as ALUs, are operative to perform at least one digital computation on one, two, or more digitized pixel values. In some embodiments, one or more user-defined functions, such custom Look-Up Tables (LUT) are provided. These may map combinations of input pixel values to predetermined outputs. Users may select desired outputs from the computational block via an output multiplexing function. The output select inputs to the mux may be stored in a control register, which may be common to many or all of the computational blocks in the array of computational circuits. The output mux allows a user to select the analog pixel value; an output of an analog computation; a digital pixel value; or an output of a digital computation or table look-up.

Image Processing

A large number of image processing algorithms are known in the art, both for improving the quality of the image/video (e.g., auto exposure, color correction, dynamic range), and for extracting information (e.g., object detection, classification, and tracking). One way to categorize such algorithms is to consider the number and configuration of inputs to distributed, parallel computational circuits performing pixel-level operations to implement them. In this approach, algorithms may be broadly classified into three classes: single-pixel input, fixed-group input, and variable-group input.

Examples of single-pixel processing include:
High Dynamic Range (HDR)—in one technique, analog pixel values are sampled and quantized numerous times over the course of each exposure time; selecting only the values from just above thermal noise to just below saturation optimizes the SNR of valid image information in the digital pixel values.
a digital scalar "stretch" operation, which adds (or subtracts) a constant from the pixel and then multiplies the result by a factor.
running average of intensity over one, two, or more frames is used in motion detection.
running average of frame-to-frame difference in intensity is a variation on the average of absolute intensity values.

Examples of algorithms wherein pixel-level image processing is performed on a fixed block of pixels include:
optical flow, which may comprise minimizing a sum of squared differences or sum of absolute differences, or maximizing normalized cross-correlation.
Sobel edge detection operates on pixel groups (originally, 3×3) to compute an approximation of the gradient of the image intensity function.
Difference of Gaussians gradient detection, comprising the subtraction of one blurred version of an image from another, less blurred version. Conceptually, this technique is a band-pass filter that removes all but a small number of spatial frequencies from an image.
histogram of oriented gradients descriptor, in which a histogram of intensity gradients per pixel cell (or group) is compiled; the concatenation of these histograms yields the descriptor. In some cases, the local histograms are contrast-normalized by calculating a measure of the intensity across a block comprising a group of adjacent cells, and using the value to normalize all cells in the block.
Canny edge detection comprises applying a Gaussian smoothing filter, finding intensity gradients, suppressing spurious responses, double thresholding to discover potential edges, and tracking the edges by hysteresis.
Advanced Video Coding (AVC, or H.264) and High Efficiency Video Coding (HEVC, or H.265) are block-based motion compensation video compression standards.
JPEG compression or encoding is a lossy compression based on discrete cosine transform (DCT), which coverts image data into the frequency domain, and decimates the image of data according to human psychovisual models.
Demosaicing/debayering reconstruct a full color image from color samples output by a pixel array overlaid with a color filter array, by interpolating the color values of pixels of the same color within a local pixel group.
Gaussian Mixture Model
differential encoding
jitter/vibration detection and suppression involves comparing frame-to-frame dislocations of objects in the image due to instability of the pixel array with respect to the scene being imaged.
flicker detection and suppression involves comparing frame-to-frame changes in exposure due to high frequency perturbations in the intensity of lighting of the scene being imaged.
LiFi is a networking physical layer transmission technique that modulates general-illumination lighting in a room to convey information to one or more receivers. It can be demodulated by comparing and extracting frame-to-frame changes in image intensity.
digital infinite impulse response filtering
digital finite impulse response filtering
Goertzel filtering allows identification and selection or rejection of specific frequency components of a signal.
Temporal and spatial Fast Fourier Transforms (FFT) sample a signal over a period of time, or space, respectively, and divides it into frequency components. Analysis of the frequency distribution is used in object detection, motion detection, tracking, and the like.
image segmentation partitions an image into multiple segments (super-pixels) as a precursor to subsequent image processing operations.
Gaussian blur or smoothing (1-D or 2-D) is an operation to reduce image noise (and detail). It is implemented by convolution of pixel blocks with a Gaussian function.
Unsharp masking uses a blurred or "unsharp" negative image to create a mask of the original image. The mask is then combined with the positive original image, which reduces blur in the original. The operation is carried out in parallel on groups of pixels.
Box blur (1-D or 2-D) is a spatial domain linear technique in which the value of each pixel is the average value of its neighboring pixels in the original image.
regional running average is similar to the per-pixel running average (of either absolute value or difference) over n frames, but is calculated for groups of pixels.

Examples of algorithms wherein pixel-level image processing is performed on a fixed block of pixels include:
Advanced Video Coding (AVC, or H.264) and High Efficiency Video Coding (HEVC, or H.265) are block-based motion compensation video compression standards. In many implementations, the block size may be dynamically determined (larger blocks yield shorter motion vectors; smaller blocks reduce prediction residual information).

motion tracking algorithms in which a pixel block "moves" across the pixel array, by redefining the rows and columns that define the block boundaries, for example to follow a feature (e.g., dot or edge) as it moves frame-to-frame.

Of course, many of the fixed-pixel-group algorithms may be expanded to operate on variably- or dynamically-defined pixel group sizes, or fixed-size pixel groups that nonetheless "move" across the pixel array. Also, the per-pixel and pixel group algorithms may be combined, or may otherwise interact. For example, running average of intensity and running average of intensity difference are per-pixel calculations that compare pixel intensity frame-to-frame. In one embodiment, the running averages are normalized by also computing a running average of intensity or difference in intensity over a group of pixels, and using this value to normalize the running averages of all pixels within the group. This reduces apparent differences due to noise, and serves to improve the SNR of the running average algorithms.

Applications

As described in the Background, not all applications for image capture and processing require high-definition, color-accurate, low-noise, artifact-free—in short, high quality—images or video. Examples include webcams, back-up cameras in vehicles, hunters' trail cameras, many surveillance camera applications, and environment-awareness cameras (as opposed to image-capture cameras) on autonomous vehicles such as self-driving cars and follow-the-subject drones. Furthermore, in many applications of image/video capture and processing, the image processing functions do not require state of the art sophistication and complexity. For example, occupancy detection is a far more tractable problem to solve than occupancy identification, and in many applications is sufficient.

One example of the latter point is the occupancy-based automation of lighting, access control, HVAC, and the like. It is known to use simple sensors, such as ultrasonic Doppler detectors or passive infrared sensors to turn on lighting, open doors, trigger cameras, or the like, in response to detecting human or animal presence. These sensors have limited range, provide only a binary detection indication, and are notorious for high false positive rates.

According to one embodiment, a lighting fixture includes an inventive imaging circuit. The imaging circuit is operative to monitor at least a zone of a room, hall, garage, or other area of interest illuminated by the lighting fixture. Relatively simple, per-pixel or per-pixel-group image processing operations, as described herein, are sufficient to perform, e.g., occupancy detection and tracking with high reliability, allowing the lighting fixture to accurately respond to, e.g., dynamic changes in occupancy. By networking with other lighting fixtures, and optionally a central controller, the lighting system may intelligently and accurately control the lighting of an entire facility in response to, e.g., actual occupancy.

Figure 10:
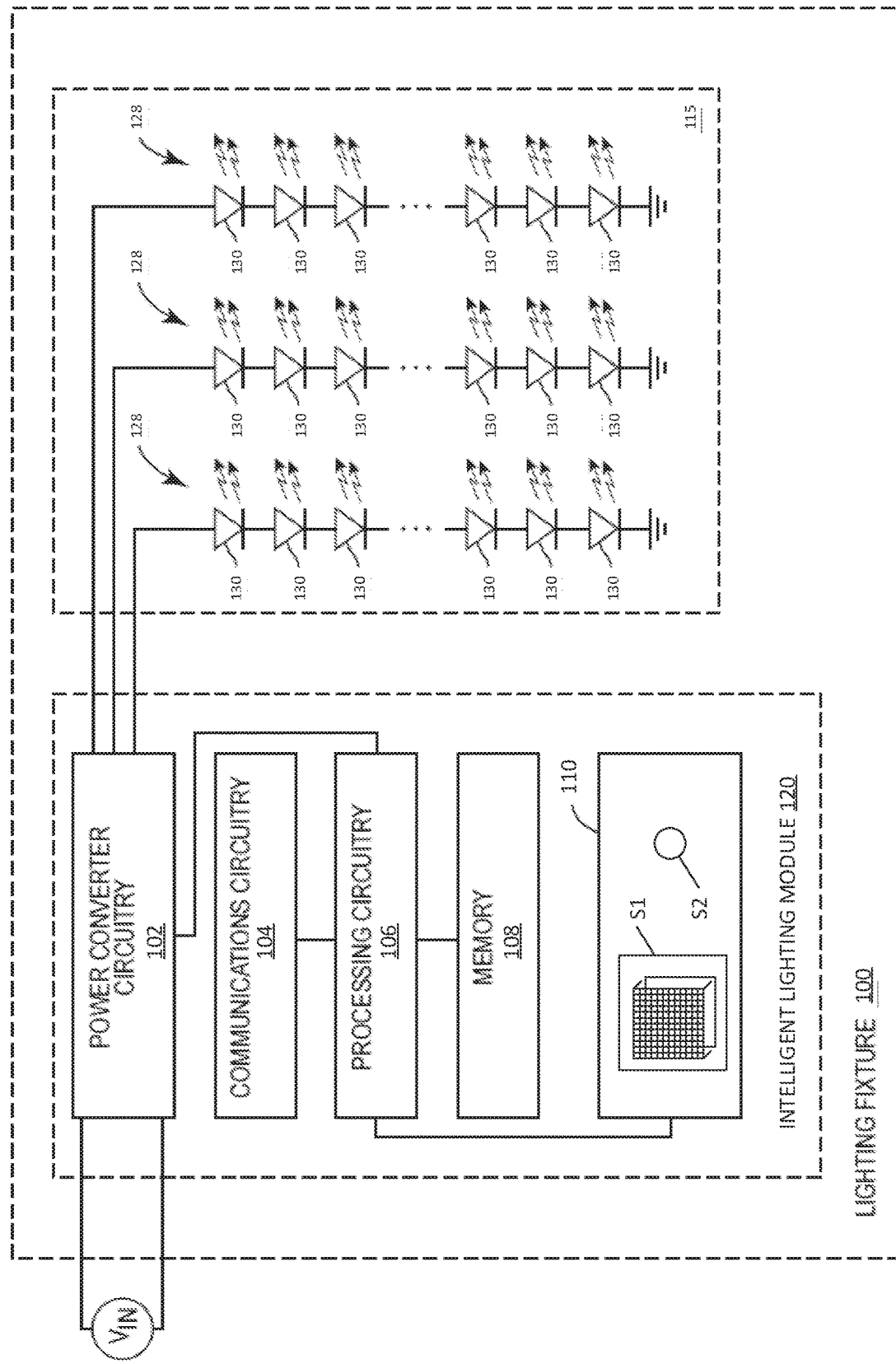
FIG. 10 is a block diagram of a lighting fixture including an imaging circuit.

FIG. 10 is a block diagram illustrating details of a lighting fixture 100 according to one embodiment. The lighting fixture 100 includes an Intelligent Lighting Module (ILM) 120 and an array of light emitting diodes (LEDs) 115. The ILM 120 includes power converter circuitry 102, communications circuitry 104, processing circuitry 106, a memory 108, and sensor circuitry 110. The power converter circuitry 102 is configured to receive an alternating current (AC) or direct current (DC) input signal (VIN) and perform power conversion to provide a regulated output power to the array of LEDs 115. Notably, the power converter circuitry 102 may be configured such that the input signal (VIN) is provided in whole or in part by a battery, such that the lighting fixture 100 is portable, capable of operating in emergencies such as power outages, and/or capable of being used in one or more off-grid applications as discussed below. In one embodiment, the power converter circuitry 102 is configured to provide a pulse-width modulated (PWM) regulated output signal to the array of LEDs 115. While not shown, a connection between the power converter circuitry 102 and each one of the communications circuitry 104, the processing circuitry 106, the memory 108, and the sensor circuitry 110 may provide regulated power to these portions of the ILM 120 as well. The processing circuitry 106 may provide the main intelligence of the lighting fixture 100, and may execute instructions stored in the memory 108 in order to do so. The processing circuitry 106 may thus control the amount of current, voltage, or both provided from the power converter circuitry 102 to the array of LEDs 115. The communications circuitry 104 may enable the lighting fixture 100 to communicate via wireless or wired signals to one or more other lighting fixtures, sensor modules, controllers, border routers, switches, or any other devices. The communications circuitry 104 may be coupled to the processing circuitry 106 such that information received via the communications circuitry 104 can be considered and acted upon by the processing circuitry 106. The sensor circuitry 110 includes an imaging circuit S1, having an array of pixels and a corresponding array of computational circuits, as described herein. The sensor circuitry 110 may additionally include one or more different types of sensors S2. For example, the sensor S2 may comprise any of a passive infrared (PIR) occupancy sensors, one or more ambient light sensors, one or more microphones, one or more speakers, one or more ultrasonic sensors and/or transducers, one or more infrared receivers, one or more imaging sensors such as a camera, a multi-spectral imaging sensor, or the like, one or more atmospheric pressure sensors, one or more temperature and/or humidity sensors, one or more air quality sensors such as oxygen sensors, carbon dioxide sensors, volatile organic compound (VOC) sensors, smoke detectors, and the like, one or more positioning sensors such as accelerometers, Global Positioning Satellite (GPS) sensors, and the like, one or more magnetic field sensors, or any other sensors. The sensor circuitry 110 may be in communication with the processing circuitry 106 such that information from the imaging circuit S1 or other sensor S2 can be considered and acted upon by the processing circuitry 106. In some situations, the processing circuitry 106 may use information from the sensor circuitry 110 to adjust the voltage and/or current provided from the power converter circuitry 102 to the array of LEDs 115, thereby changing one or more aspects of the light provided by the lighting fixture 100. In other situations, the processing circuitry 106 may communicate information from the sensor circuitry 110 via the communications circuitry 104 to one or more of the devices or one or more of the border routers in a distributed lighting network, or to one or more of the remote devices. In still other situations, the lighting fixture 100 may both change one or more aspects of the light provided therefrom based on information from the sensor circuitry 110 and communicate the information from the sensor circuitry 110 via the communications circuitry 104.

The array of LEDs 115 includes multiple LED strings 128. Each LED string 128 includes a number of LEDs 130 arranged in series between the power converter circuitry 102 and ground. Notably, the disclosure is not limited to lighting fixtures 100 having LEDs 130 arranged in this manner. The LEDs 130 may be arranged in any series/parallel combination, may be coupled between contacts of the power converter circuitry 102, or arranged in any other suitable configuration without departing from the principles described herein. The LEDs 130 in each one of the LED strings 128 may be fabricated from different materials and coated with different phosphors such that the LEDs 130 are configured to provide light having different characteristics than the LEDs 130 in each other LED string 128. For example, the LEDs 130 in a first one of the LED strings 128 may be manufactured such that the light emitted therefrom is green, and include a phosphor configured to shift this green light into blue light. Such LEDs 130 may be referred to as blue-shifted green (BSG) LEDs. The LEDs 130 in a second one of the LED strings 128 may be manufactured such that the light emitted therefrom is blue, and include a phosphor configured to shift this blue light into yellow light. Such LEDs 130 may be referred to as blue-shifted yellow (BSY) LEDs. The LEDs 130 in a third one of the LED strings 128 may be manufactured to emit red light, and may be referred to as red (R) LEDs. The light output from each LED string 128 may combine to provide light having a desired hue, saturation, brightness, etc. Any different types of LEDs 130 may be provided in each one of the LED strings 128 to achieve any desired light output. The power converter circuitry 102 may be capable of individually changing the voltage and/or current provided through each LED string 128 such that the hue, saturation, brightness, or any other characteristic of the light provided from the array of LEDs 130 can be adjusted.

Figure 11:
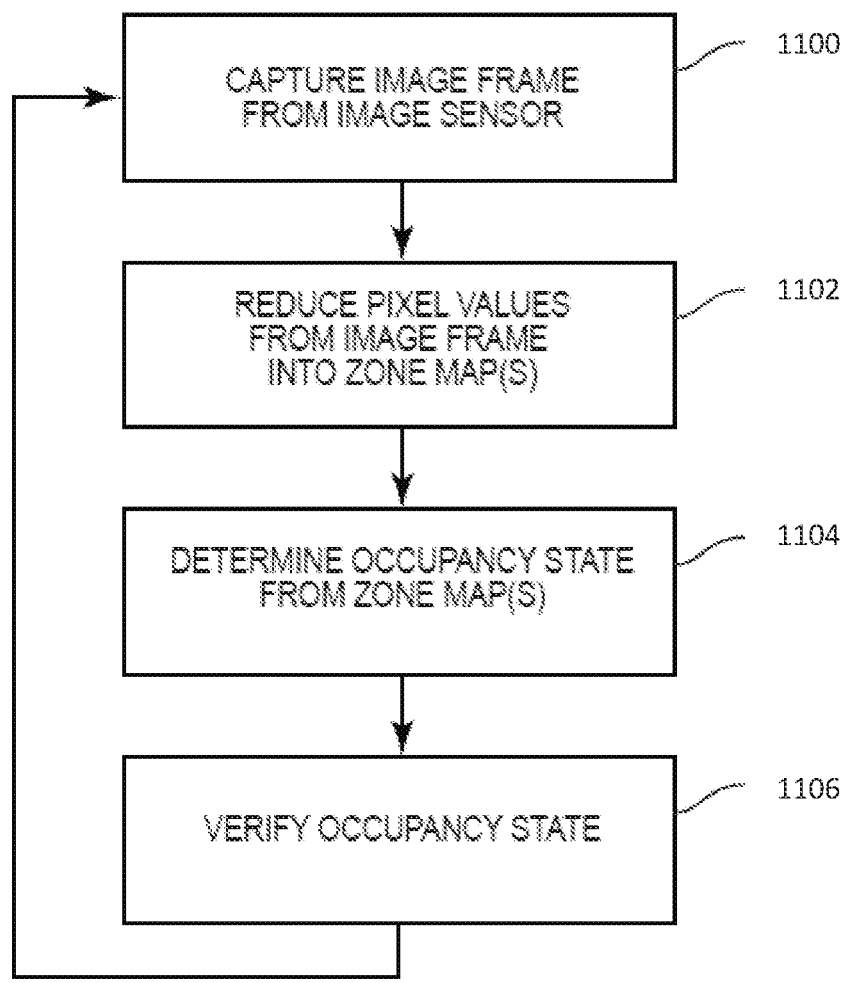
FIG. 11 is a flow diagram of a method of determining occupancy from an image sensor.

The lighting fixture 100 includes an imaging circuit S1 in the sensor circuitry 110. The imaging circuit S1 conforms to one or more embodiments of image circuits described herein, comprising a pixel array and a distributed, parallel array of computational circuits associated therewith. Further, it is desirable to use the imaging circuit S1 to determine one or more environmental conditions such as occupancy state and ambient light level. Accordingly, FIG. 11 is a flow chart illustrating a method for determining an occupancy state based on image data from the imaging circuit S1. As discussed herein, an occupancy state indicates whether an area of interest is occupied or unoccupied by a person or other object of interest (e.g., a vehicle such as a forklift). The occupancy state may thus be occupied or unoccupied.

First, an image frame is captured by the imaging circuit S1 (step 1100). As discussed herein, an image frame is a data structure including a number of pixel values representing the light detected by the imaging circuit S1 at a particular moment of time. The pixel values may be formatted in any number of ways and may include, for example, values representing an intensity of light detected for a number of color channels (e.g., red, green, and blue). Spatial data is associated with each of the pixel values so that they are associated with a particular part of the image frame. Accordingly, the image frame can be thought of as a matrix of pixel values, wherein each pixel value describes the light captured in a portion of the image frame.

To determine one or more environmental conditions from the image frame or a number of image frames, the pixel values in the image frame are divided into zones and reduced to form one or more zone maps (step 1102). For example, the image frame may be separated into four, five, six, seven, eight, nine, or any other number of zones each including a subset of the pixel values. The pixel values in these zones may then be reduced to a zone value which is an aggregate of the pixel values in the zone. In one embodiment, reducing the pixel values within a zone to a zone value is done by averaging the pixel values. The pixel values themselves may be individually reduced into a single value (e.g., by combining the separate intensity information for the different color channels into a single value such as luma or luminance) before reducing the pixel values within each zone to a zone value. In another embodiment, reducing the pixel values within a zone to a zone value is done by summing the pixel values. The result is a significantly downscaled image frame that is much easier to analyze and thus determine environmental conditions. The size of each one of the zones and thus the number of zones the image frame is separated into may be determined based on the size of an object of interest within the image frame associated with the detection of an environmental condition. For example, the zones may be sized approximately equal to the size a person will appear in the image frame to detect an occupancy state.

Next, the occupancy state is determined based on the one or more zone maps (step 1104). Determining the occupancy state based on the one or more zone maps may involve analyzing the zone maps according to a set of rules to detect when a person or other object of interest is present in the image frame while ignoring objects in the image frame which do not indicate occupancy (e.g., shadows, nearby lights turning on or off, small animals, etc.). Details regarding determining the occupancy state from the one or more zone maps are discussed below. Finally, the occupancy state may be verified (step 1106). Verifying the occupancy state may involve further screening the zone maps for false positive events and thus making sure that the occupancy detected in the previous step was correct. In various embodiments, the last two steps are combined into a single step such that verifying the occupancy state is simply part of determining the occupancy state.

Figure 12:
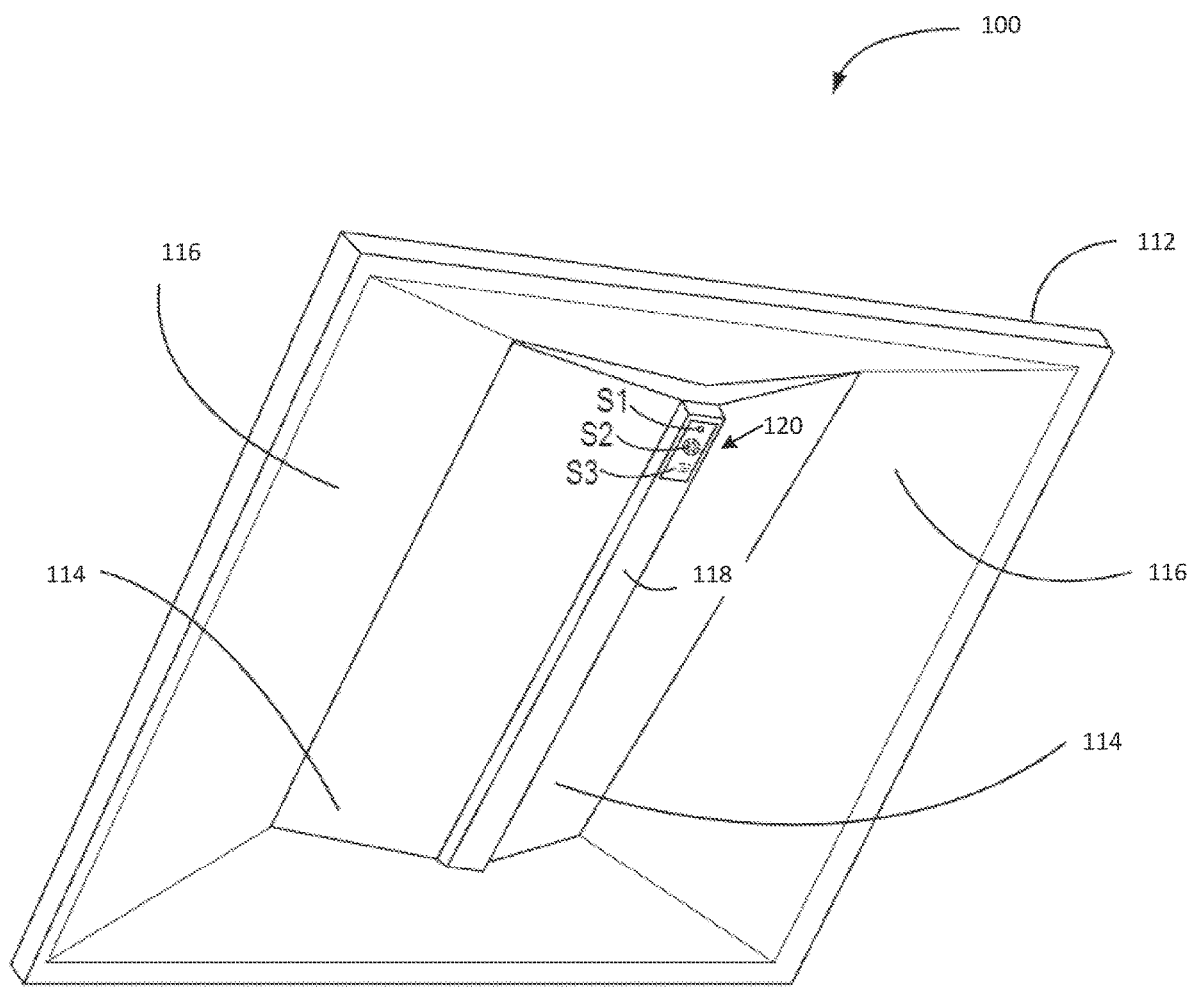
FIG. 12 is a perspective view of a lighting fixture including an imaging circuit.

FIG. 12 depicts the lighting fixture 100 in a troffer type housing. This particular lighting fixture is substantially similar to the CR and CS series of troffer-type lighting fixtures that are manufactured by Cree, Inc. of Durham, N.C.

In general, troffer-type lighting fixtures, such as the lighting fixture 110, are designed to mount in, on, or from a ceiling. In most applications, the troffer-type lighting fixtures are mounted into a drop ceiling (not shown) of a commercial, educational, or governmental facility. As illustrated in FIG. 12, the lighting fixture 100 includes a square or rectangular outer frame 112. In the central portion of the lighting fixture 100 are two rectangular lenses 114, which are generally transparent, translucent, or opaque. Reflectors 116 extend from the outer frame 112 to the outer edges of the lenses 114. The lenses 114 effectively extend between the innermost portions of the reflectors 116 to a central mounting member 118, which may double as a heatsink and functions in this embodiment to join the two inside edges of the lenses 114. The ILM 120 is mounted in, on, or to the central mounting member 118 (or any other suitable portion of the lighting fixture 100). The ILM 120 provides intelligence for the lighting fixture 100, houses or is otherwise coupled to the imaging circuit S1, and facilitates wired and/or wireless communications with other lighting fixtures 100 or other remote entities, via the communications circuitry 104.

In essence, the ILM 120 is a control and communications module for the lighting fixture 100. The communications with other lighting fixtures 100 and other entities may relate to sharing state information and sensor information, as well as providing instructions or other information that aids in the control of the lighting fixtures 100 or other entities during normal operation or commissioning. While two auxiliary sensors S2-S3 are illustrated (that is, sensors other than the inventive imaging circuit S1), the lighting fixture may have any number of the same or different sensors. The sensors may include comprise, e.g., a passive infrared (PIR) sensor, acoustic, ambient light, temperature, humidity, pressure, vibration, carbon monoxide, carbon dioxide, air quality, smoke, power, or like sensors.

Figure 13:
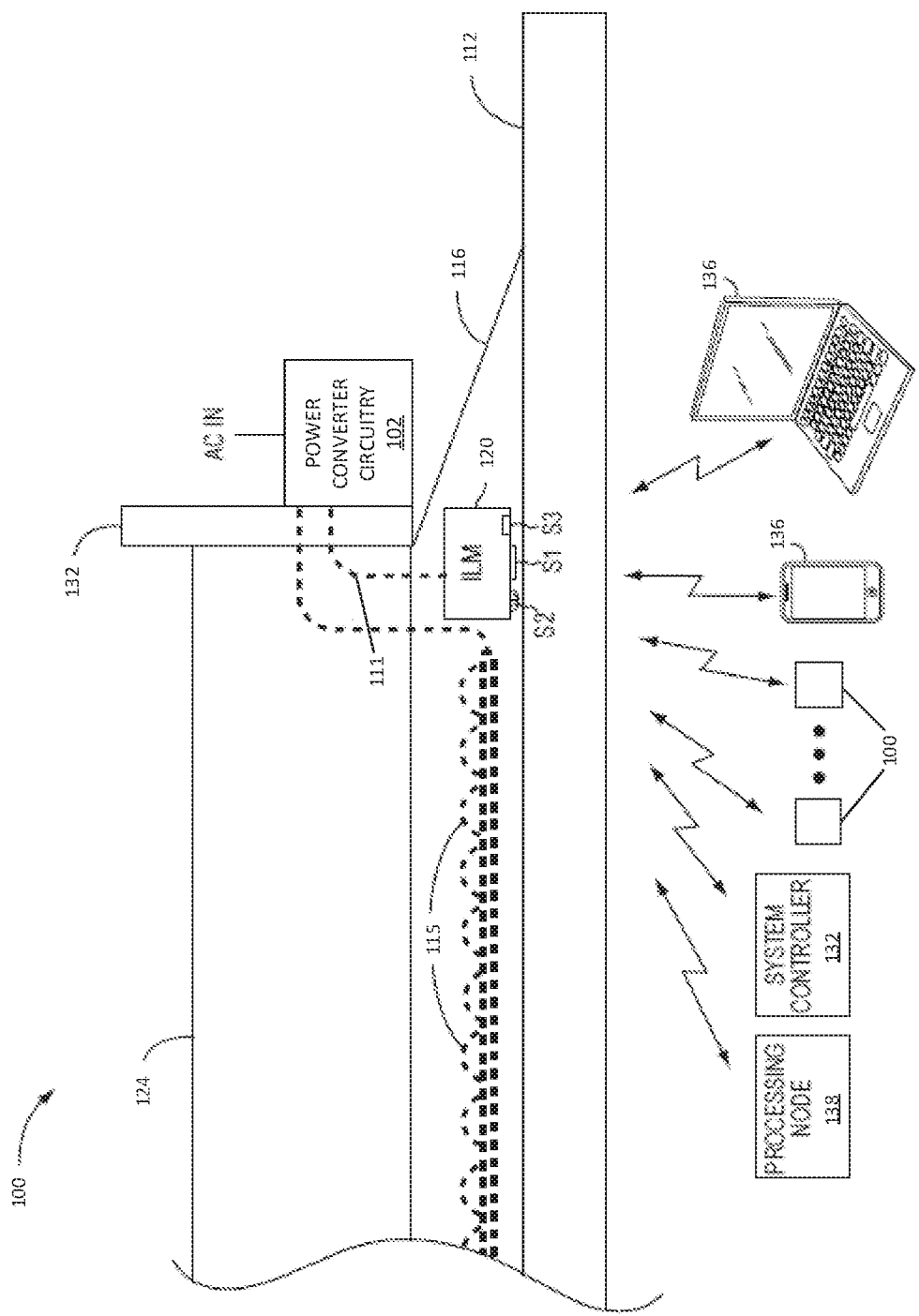
FIG. 13 is a block diagram of a lighting fixture in a lighting fixture network.

As illustrated in FIG. 13, the power converter circuitry 102 is coupled to the LED array 115 and the ILM 20 through appropriate cabling 111 and is mounted to a driver mount 132 of the lighting fixture 100. In normal operation, The ILM 120 uses its internal logic to determine an on/off state and an output level for the LED array 115 based on information received directly or indirectly from one or more sensors S1-S3, other lighting fixtures 100, and/or remote entities, such as such as control nodes 136, processing nodes 138, system controllers 134, wall controllers (not shown), and the like. The ILM 120 may also send information bearing on the state of the lighting fixture 100, sensor information, control information, requests for information, and the like to one or more of the other lighting fixtures 100 and/or remote entities.

The system controller 134 represents any type of remote control entity that is configured to control at least one system other than the lighting network in which the lighting fixtures 100 reside. For example, the system controller 134 may be a controller for one or more of a heating, ventilation air conditioning (HVAC) system, a security system, a fire protection system, an irrigation system, a manufacturing system, evacuation systems, occupancy monitoring or control systems, and the like. As discussed in detail below, the concepts provided herein allow the lighting network not only to determine whether various spaces are occupied, but also to determine the number of occupants in a space when the space is occupied. With modern HVAC systems that include variable speed refrigerant flows and fan speeds, HVAC control is no longer simply turning on or the HVAC system. The rate or level of heating, cooling, and/or ventilation is variable. With the concepts provided herein, HVAC control may take into consideration not only room temperature, but also the number of occupants in the room, which is referred to herein as an occupancy level.

The lighting network is able to report the occupancy level for each space such that the HVAC control can dynamically adjust the level of heating, air conditioning, and/or ventilation for each space based on temperature as well as changing occupancy levels. A space with more people may benefit from higher levels of heating, air conditioning, and/or ventilation, and vice versa. In addition to or in lieu of controlling the heating, air conditioning, and/or ventilation levels based on the occupancy level, other HVAC settings may be dynamically controlled or adjusted based on occupancy levels. For example, the HVAC set points, set backs, and/or dead bands (hysteresis ranges about a set point or set back) may be dynamically changed on a room-by-room basis or globally for an entire environment that includes those rooms. As indicated above, HVAC control based on actual occupancy levels as opposed to general occupancy is on one example of control.

The lighting fixtures 100 may be configured to communicate directly with the system controllers 134 or provide the occupancy information to an intermediate device, such as the processing node 138 or control node 136, which will process the occupancy information collected from a group of lighting fixtures 100 and provide appropriate occupancy related instructions or information to the system controllers 134. The processing nodes 138 are generally part of the lighting network and may be used to facilitate configuring the various lighting fixtures 100 in the lighting network during commissioning; group control of the lighting fixtures 100, if such control is not distributed amongst the lighting fixtures 100; communications with remote entities, and the like. The control nodes 136 are dedicated lighting control devices that are used to configure or control the lighting fixtures 100 individually or as a group.

Figure 14:
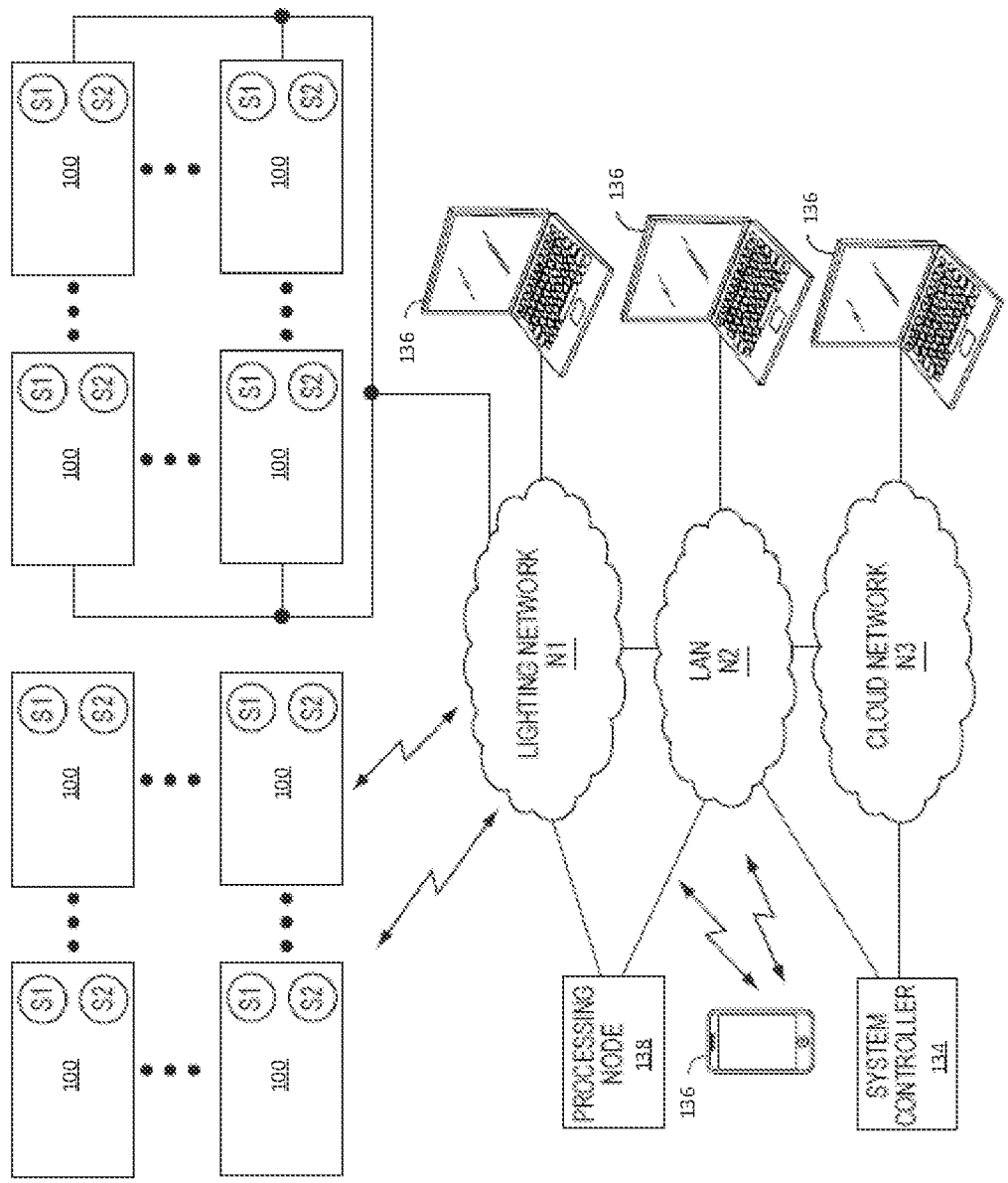
FIG. 14 is a network diagram of multiple lighting fixture networks.

Turning now to FIG. 14, an exemplary lighting network is illustrated. The lighting network includes multiple lighting fixtures 100, each of which includes an imaging circuit S1 according to embodiments described herein, and a second sensor S2, which is a PIR-based occupancy sensor.

As illustrated, a first group of the lighting fixtures 100 are configured to communicate with one another as well as other entities using wireless communications and form part of or are coupled to a lighting network N1. A second group of the lighting fixtures 100 are configured to communicate with one another as well as other entities using wired communications, such as Ethernet-based communications, and also form part of or are coupled to the lighting network N1. The lighting network N1 may be coupled to a traditional local area network (LAN) N2, which supports traditional networking within an organization. The LAN N2 is further coupled to a cloud network N3, such as the Internet or like network infrastructure that facilitates communications with remote entities, servers, services, and the like in traditional fashion. Communications with the various system controllers 134, control nodes 136, and processing nodes 138 may be supported by any one of the lighting network N1, LAN N2, and cloud network N3, depending on the location and functionality of the devices. Although not illustrated, the lighting network N1 may include various routers, switches, gateways, standalone sensors, wall controllers for turning on and off as well as dimming all or groups of the lighting fixtures 100, and the like.

Figure 15:
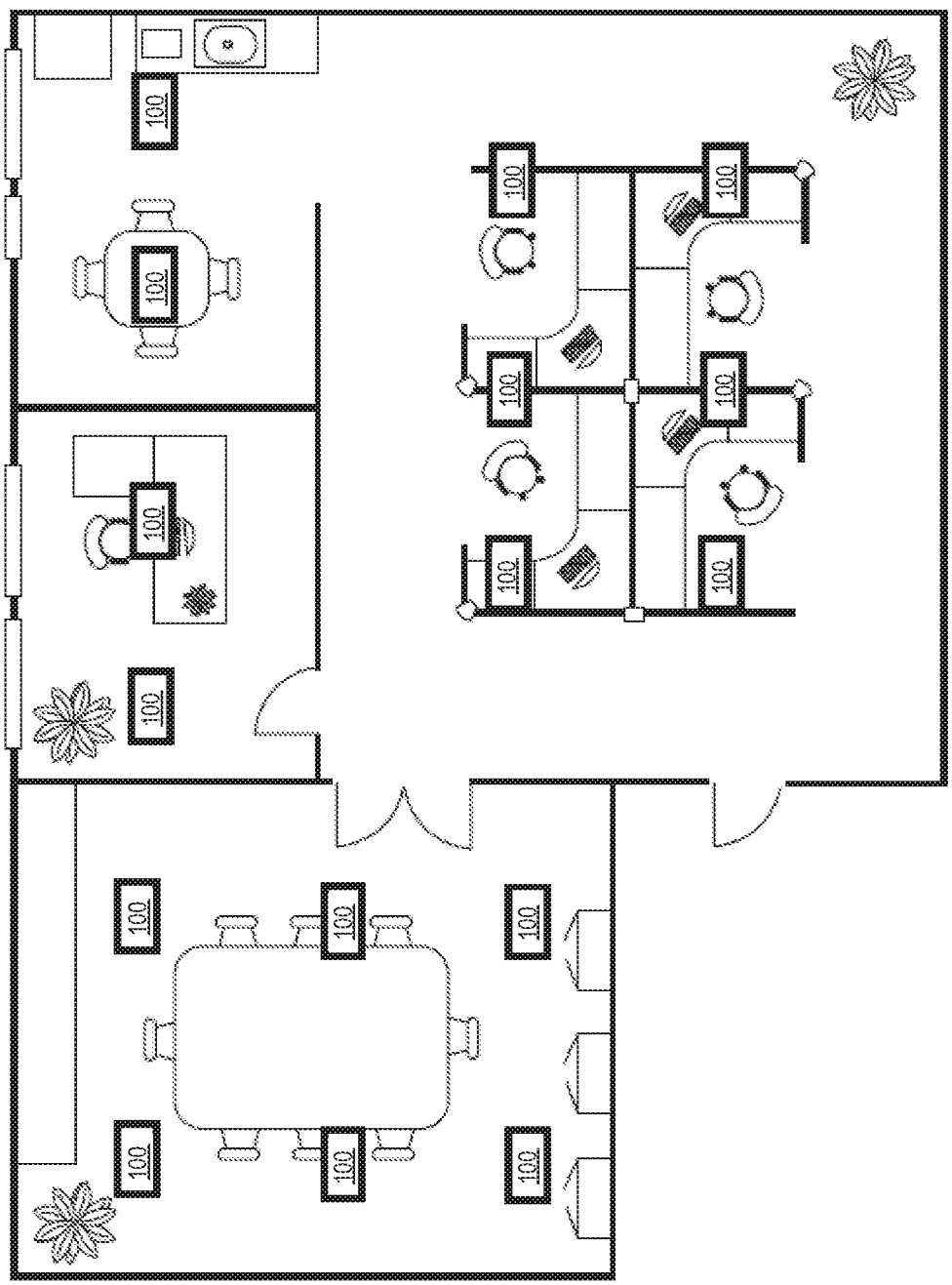
FIG. 15 is a floor plan showing the distribution of lighting fixtures in a facility.

FIG. 15 illustrates an exemplary office environment with numerous lighting fixtures 100 distributed in the ceiling of the office environment and used for general illumination. Each of the lighting fixtures 100 includes at least one imaging circuit S1 and one PIR-based occupancy sensor S2. In this configuration, the imaging circuit S1 is used as a primary occupancy sensor of high resolution, while the PIR-based occupancy sensor S2 is used as a secondary occupancy sensor of much lower resolution.

Figure 16A:
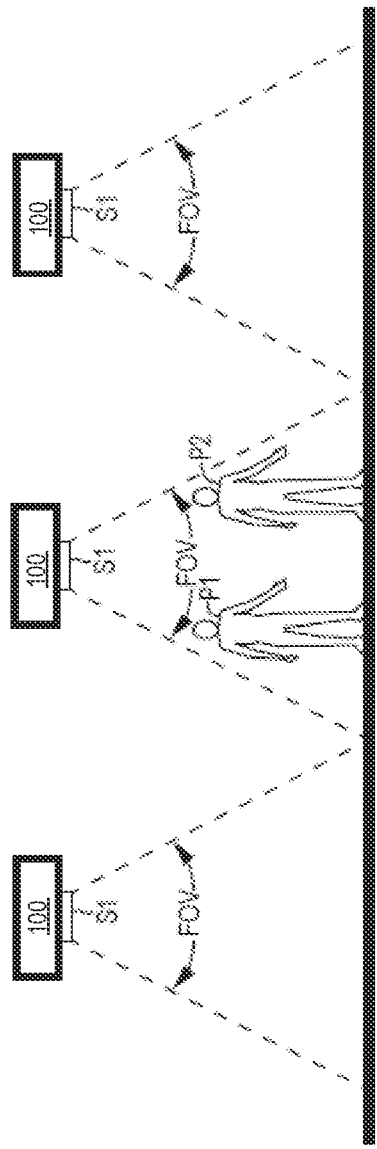
FIG. 16A is a diagram showing non-overlapping Fields of View of an imaging circuit in a lighting fixture.
Figure 16B:
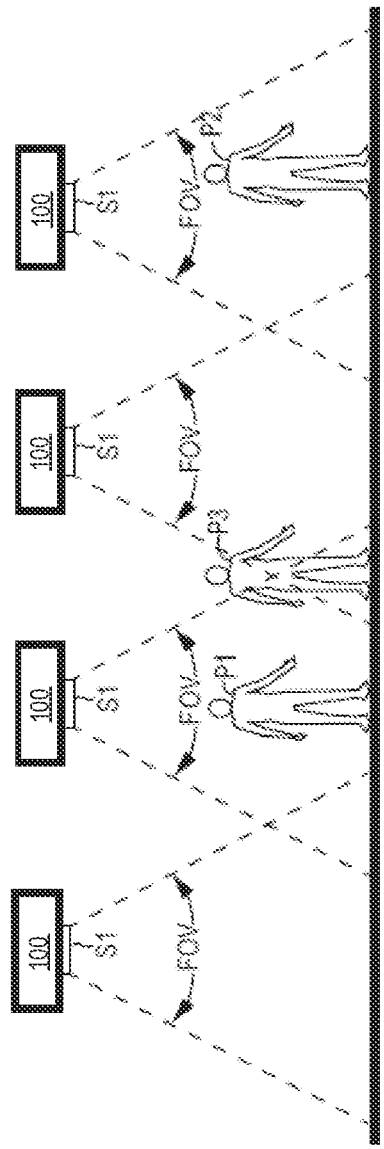
FIG. 16B is a diagram showing overlapping Fields of View of an imaging circuit in a lighting fixture.

As illustrated in FIGS. 16A and 16B, the imaging circuit S1 for each lighting fixture 100 has an associated field of view (FOV). The field of view (FOV) corresponds to an area from which the imaging circuit S1 of the lighting fixture 100 can capture image information. An image is broadly defined herein to include image related information that is captured by the imaging circuit S1. The image related information includes, but is not limited to, information that corresponds to all or part of a still image, all or part of one or more video frames, characteristics (i.e. color, wavelength, brightness, contrast, size, shape, etc.) of any aspect of all or part of a still image or one or more video frames, or any combination thereof. The fields of view (FOVs) for the imaging circuit S1 of the respective lighting fixtures 100 may be fixed or variable depending on the design of the imaging circuit S1 and/or the associated lighting fixtures 100. In either case, the fields of view (FOVs) may either substantially align with one another, such that there is little or no overlap, as provided in FIG. 16A, or substantially overlap with one another, as provided in FIG. 16B. Details are provided further below on how these different configurations affect the tracking of occupants throughout a given environment.

Figure 17:
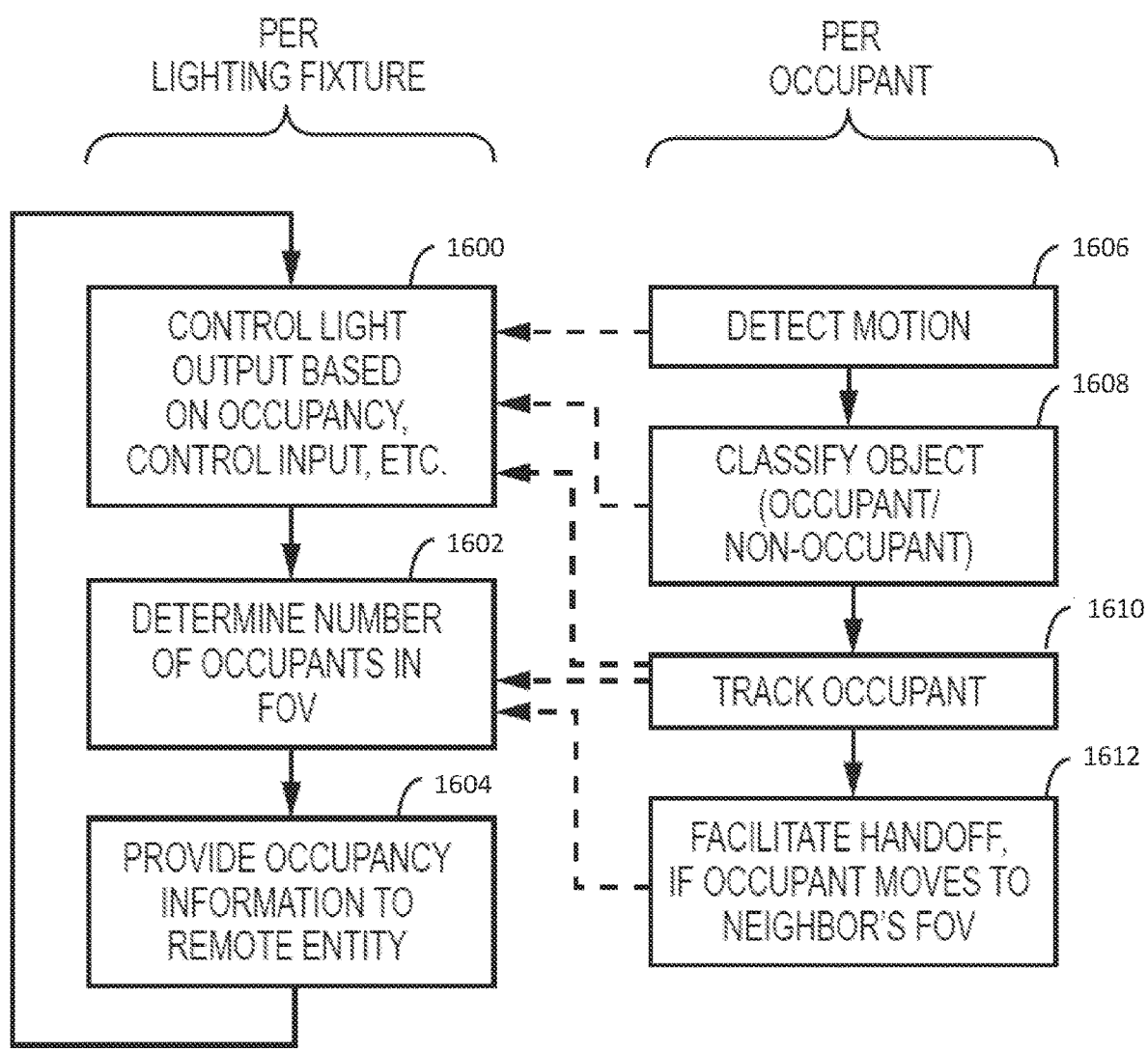
FIG. 17 is a flow diagram of occupancy detection and tracking, from per lighting fixture and per occupant perspectives.

Turning now to FIG. 17, a flow diagram is provided to illustrate both the general operation of each lighting fixture 100 as well as tracking of occupants within a given environment. Each lighting fixture 100 will control its light output for general illumination based on information or instructions provided by other entities and/or sensors (step 1600). For example, light output may be controlled, such as being turned on, turned off, or dimmed to a desired level, based on information received from one or any combination of an associated wall controller, control node 136, system controller 134, processing node 138, other lighting fixture 100, and the like.

In addition to providing light for general illumination, each lighting fixture 100 is configured to determine the number of occupants in the associated field of view (step 1602) and provide occupancy information, based on the number of occupants in the associated field of view, to a remote entity, such as the system controller 134, control node 136, processing node 138, and the like (step 1604). In essence, the occupancy information for a given lighting fixture 100 generally corresponds to the number of occupants within the lighting fixture's field of view. Based on the occupancy information for the lighting fixtures 100 in a given area, the number of occupants for the given area may be calculated by summing the number of occupants that are in the fields of view for each of the lighting fixtures in the given area. In certain embodiments, steps are taken to avoid redundantly counting an occupant that resides in multiple fields of view at the same time. Details are provided further below.

As indicated above, controlling the light output (step 1600), determining the number of occupants in an associated field of view (step 1602), and providing occupancy information to a remote entity (step 1604), are provided on a fixture-by-fixture basis. Each lighting fixture 100 uses the imaging circuit S1, and possibly also additional sensors S2, etc. to track occupants on a per occupant basis. As such, one or more occupants may be tracked by a given lighting fixture 100 at any given time. In one embodiment, the lighting fixture 100 will use the imaging circuit S1, and possibly also additional sensors S2, etc. to detect motion caused by a moving object in the associated field of view (step 1606) and classify the object as either an occupant or non-occupant (step 1608). An occupant is considered as a person (human), while a non-occupant is generally considered an object, or anything other than a person. If an object is classified as an occupant, the occupant is tracked while the occupant remains in the associated field of view (step 1610).

When the occupant moves or is predicted to move outside of the associated field of view, the lighting fixture 100 will coordinate with neighboring lighting fixtures 100 to facilitate a handoff of the occupant tracking to the neighboring lighting fixture 100 that provides a field of view to which the occupant has moved or is predicted to move (step 1612). The detection, classification, tracking, and handoff steps 1606-1612 may provide information that is helpful when both controlling the light output (step 1600) as well as determining the number of occupants in the field of view of a given lighting fixture 100 (step 1602). In essence, as occupants are detected in or leave the associated field of view, the lighting fixture 100 will dynamically update and report on the total number of occupants in its associated field accordingly. Again, occupants within the associated field of view of a particular lighting fixture 100 may be tracked on an individual basis, where the lighting fixture 100 may track multiple occupants at any given time.

In the imaging circuit S1, fundamental, pixel-level image processing is performed in parallel by a large plurality of computational circuits. Accordingly, there is no need to transfer very large amounts of pixel data to a central CPU, and into and out of memory. Thus, while the imaging circuit S1 is more costly than a comparable conventional pixel array (without the distributed, parallel computational circuits), the system cost is far lower, and consumes less power overall. Because of the pixel-level image processing performed in/by the imaging circuit S1, the information transferred to, e.g., the system controller 134 for higher-level processing, is far lower in volume, and requires a lower transfer rate, than that required by prior art imaging systems. Accordingly, the ILM 120 components can operate at a lower frequency, with lowered cost and reduced power consumption, compared to conventional image processing or general-purpose processors. Indeed, the cost of a conventional image capture and processing system would be prohibitive for the cost-sensitive application of deployment in lighting fixtures. It is only the inventive concept of providing distributed, parallel computational circuits to perform pixel-level image processing tasks that realistically enables this application.

In general, the networked occupancy detection and tracking system described above—which may receive image-processed information from inventive imaging circuits S1 installed on devices other than lighting fixtures 100—may use the image-processed information for far more than lighting control. Occupancy/object detection and tracking is applicable to a broad array of autonomous or automated functions, such as:

access control, from simply opening/closing doors as people or animals approach, to calling for an elevator as someone approaches rather than waiting until they actuate a button, to sophisticated access control in high security areas.

traffic control, such as automatically reassigning directions of travel on vehicles lanes based on vehicle movement; or detecting vehicles at intersections to control on-demand traffic control signals, signaling to moving vehicles such as forklifts, cars or trucks when a collision is predicted, and the like.

engaging automatic food or water systems in livestock facilities based on the number of animals present.

demand-controlled ventilation—such as controlling gas sources to provide a nitrogen environment to prevent fire or retard the spoliation of produce, but inject oxygen upon detecting humans entering the area, or for modulating exterior to interior air replenishment on the basis of occupancy rather than by an open loop schedule.

notifying emergency responders which spaces are occupied when they are responding to a situation such as a fire, earthquake or security alert.

analyzing travel behavior, transit times and delays to optimize routes for the stocking or restocking of warehouse or retail shelf space, or for retrieving raw goods inventory from warehouse locations in a manufacturing setting.

early detection of conditions that may lead to a failure or emergency, such as using thermal IR images to discern when mechanical parts are wearing, experiencing greater friction and trending toward failure, or using IR imagery to see hot spots that may be precursors to a fire even before smoke or flames occur.

monitoring all of the parking spaces in a parking lot or parking structure to maintain a list of open spaces and sending a notification of the nearest to a client application in a vehicle when it enters the parking area, or alternately monitoring the license plates for all the parked vehicles in the space and making this available to customers if they forget where they parked or to properly authorized law enforcement officials if searching for a particular vehicle.

package/object handling—starting/stopping or otherwise controlling conveyers, pick-and-place robots, and the like in response to detecting packages or other objects (e.g., automated luggage handling systems in airports).

As can be seen from this non-limiting list of advantageous applications of image data from a distributed imaging network, a wide variety of uses may be exploited from the same set of data. Furthermore, more optimal imaging and computing modules will afford more widespread use with more nodes on the network, a larger aggregate number of pixels and at better resolutions. This enables even more use cases and unlocks greater value, all benefits to be expected from the optimal imaging computing devices according to embodiments described herein.

The term "proximal" generally means "physically adjacent or near," as distinct from distal or remote. In some embodiments, as applied to a pixel, proximal means located within a radius in 3 dimensions no greater than 1, 2, 3, 5, 10, 20, or up to 100 times the diagonal dimension of that pixel. In some embodiments, as applied to a group of pixels (such as a 1D or 2D region of pixels, or a row or column, or segment of a row or a column, or a sparse distributed collection of pixels from within the focal plane array), proximal means located within a radius in 3 dimensions no greater than 1, 2, 3, 5, 10, 20, or up to 100 times the diagonal dimension of that pixel to the nearest member of that group of pixels. In some embodiments, a computational circuit being proximal to one or more pixels means located integral with the corresponding pixel or group of pixels on which they will be performing computations. In some embodiments, proximal means located in the same chip as the image sensor array or in a chip stacked with the image sensor chip. In some embodiments, the pixel array and the computational circuit array are proximal because they are spread in adjacent and/or parallel planes.

Computing in a fashion that is proximal to a pixel or to a group of pixels enables a high or massive degree of parallelism local to the source of the data (the imaging chip), before the data is aggregated and sent to a remote store (external memory) to be operated on by a central processing element.

The term "dedicated" to one or more pixels, means the computational circuit is logically dedicated in such a manner to be used on a recurring basis for processing of pixel values and other intermediate data from that one or more pixels or associated computational elements, and more particularly not performing the same computational services in a general way to arbitrarily selected pixels or groups of pixels (as is the case for the CPU 16 in the prior art imaging system depicted in FIG. 1). Dedicated compute elements are not necessarily proximal. In some embodiments, dedicated compute elements could be collected into a dense array of computational elements at the periphery of a pixel array, either on a monolithic chip or other closely coupled arrangement, by manner of an array of highly parallel, low latency connections. In some embodiments, dedicated compute elements can still nonetheless be physically located nearby the pixel array, generally within 1, 2, 3, 5, 10, 20, or up to 100 times the diagonal dimension of the pixel array. In some embodiments, dedicated means that each computational circuit only operates on predetermined pixels, e.g., when each element of the computational array is hardwired or connected by direct electrical connections to corresponding pixels in the pixel array. Dedicated computational elements still afford the benefits of parallelism with some compromise in the benefits of localization delivered by proximal compute elements if themselves not proximal.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. An imaging circuit, comprising:
an array of pixel sensors, each pixel sensor operative to generate a pixel value in response to incident photons, said array of pixel sensors arranged in rows and columns;
a plurality of Analog to Digital Converters (ADC) disposed adjacent said pixel sensor array along at least one side of one or both of said rows and columns and configured to digitize pixel values; and
a plurality of computational circuits operating in parallel and equal in number to the rows or columns, each computational circuit being disposed proximate to said ADCs and configured to perform one or more computations on one, two, or more digital pixel values, wherein each computational circuit, other than those at either end, receives input from an associated row or column and both immediately adjacent rows or columns.

2. The imaging circuit of claim 1 wherein said plurality of computational circuits comprise a plurality of combinatorial, sequential, or arithmetic computational circuits.

3. The imaging circuit of claim 2 further comprising memory associated with each row or column and operative to store at least three successive pixel values as the pixel values are shifted out of the row or column.

4. The imaging circuit of claim 3 wherein each combinatorial, sequential, or arithmetic computational circuit, other than those at either end, receives as input the current and previous two pixel values for the associated row or column, and both immediately adjacent rows or columns.

5. The imaging circuit of claim 2 wherein each combinatorial, sequential, or arithmetic computational circuit is an Arithmetic Logic Unit (ALU).

6. The imaging circuit of claim 2 wherein each combinatorial, sequential, or arithmetic computational circuit is implemented as a programmable logic block.

7. The imaging circuit of claim 1 wherein said one, two, or more pixel values comprise a past and a current value generated by the same pixel.

8. The imaging circuit of claim 1 wherein said incident photons comprise visible light.

9. The imaging circuit of claim 1 wherein said incident photons comprise ultraviolet light.

10. The imaging circuit of claim 1 wherein said incident photons comprise near infrared light.

11. The imaging circuit of claim 1 wherein said incident photons comprise thermal infrared radiation.

12. The imaging circuit of claim 1 wherein said one or more computations relate to an algorithm selected from the group consisting of a stretch operation, a scalar multiply, add, subtract or divide operation, optical flow, Sobel edge detection, Difference of Gaussians gradient detection, histogram of gradients, Canny Corners, H.264/265 encoding, JPEG encoding, demosaic, debayer, motion detection using Gaussian Mixture Model, n-frame differencing, differential encoding, jitter detection/suppression, vibration detection/suppression, flicker detection/suppression, LiFi demodulation/decode, digital infinite impulse response filtering, digital finite impulse response filtering, Goertzel filtering, temporal FFT, spatial FFT, local area median, 1D or 2D Gaussian blur, Unsharp Mask, 1D or 2D box filter, running average, regional running average, and regional running average of differences.

13. The imaging circuit of claim 1 wherein a group comprises an n×m zone of pixel sensors, where n and m are integers, and wherein performing one or more computations on two or more pixel values comprises downsampling the n×m zone of pixel values to one pixel value.

14. The imaging circuit of claim 13 wherein each group of pixels comprises a square region of pixel sensors.

15. The imaging circuit of claim 1 further comprising:
a plurality of light sources; and
a controller connected to the light sources and the arrays of pixel sensors and computational circuits; and operative to receive image-processed information from the outputs of the computational circuits, and further operative to control the plurality of light sources in response to the image-processed information.

16. The imaging circuit of claim 15 wherein the controller is further connected to a network of two or more imaging circuits including light sources.

17. An imaging circuit, comprising:
an array of pixel sensors, each pixel sensor operative to generate a pixel value in response to incident photons, said array of pixel sensors arranged in rows and columns;
a plurality of Analog to Digital Converters (ADC), each associated with a row or column, and configured to digitize pixel values; and
a plurality of computational circuits operating in parallel and equal in number to the rows or columns, each computational circuit being associated with an ADC and configured to perform one or more computations on one, two, or more digital pixel values, wherein each computational circuit, other than those at either end, receives input from an associated row or column and both immediately adjacent rows or columns.

18. A control system, comprising:
a plurality of imaging circuits, each imaging circuit comprising
an array of pixel sensors, each pixel sensor operative to generate a pixel value in response to incident photons, said array of pixel sensors arranged in rows and columns;
a plurality of Analog to Digital Converters (ADC) disposed adjacent said pixel sensor array along at least one side of one or both of said rows and columns and configured to digitize pixel values; and
a plurality of computational circuits operating in parallel and equal in number to the rows or columns, each computational circuit being disposed proximate to said ADCs and configured to perform one or more computations on one, two, or more digital pixel values, wherein each computational circuit, other than those at either end, receives input from an associated row or column and both immediately adjacent rows or columns; and
a controller operative to receive and further process image-processed information from each imaging circuit, and operative to control one or more devices in response to the information.

19. The control system of claim 18 wherein the one or more device controlled by said controller comprise lighting fixtures.

20. The control system of claim 19 wherein the lighting fixtures include the imaging circuits.

21. The control system of claim 18 wherein the one or more device controlled by said controller comprise HVAC systems of one or more buildings or structures.

22. The control system of claim 18 wherein the one or more device controlled by said controller comprise access control devices.

23. The control system of claim 18 wherein the one or more device controlled by said controller comprise package handling devices.

* * * * *